United States Patent
Bernhardt et al.

(10) Patent No.: US 6,792,462 B2
(45) Date of Patent: Sep. 14, 2004

(54) METHODS, SYSTEMS AND COMPUTER PROGRAM PRODUCTS FOR RULE BASED DELEGATION OF ADMINISTRATION POWERS

(75) Inventors: Thomas Bernhardt, Spring, TX (US); Marcus Richard Erickson, Sugar Land, TX (US); Chandrashekhar Vaidya, Sugar Land, TX (US)

(73) Assignee: NetIQ Corporation, San Jose, CA (US)

( * ) Notice: Subject to any disclaimer, the term of this patent is extended or adjusted under 35 U.S.C. 154(b) by 760 days.

(21) Appl. No.: 09/760,540

(22) Filed: Jan. 16, 2001

(65) Prior Publication Data

US 2002/0133579 A1 Sep. 19, 2002

(51) Int. Cl.[7] ............................................. G06F 15/173
(52) U.S. Cl. ...................... 709/225; 709/229; 709/223
(58) Field of Search ................................ 709/225, 223, 709/229

(56) References Cited

U.S. PATENT DOCUMENTS 5,991,802 A * 11/1999 Allard et al. ............... 709/219
6,105,069 A * 8/2000 Franklin et al. ............ 709/229

OTHER PUBLICATIONS

OnePoint Dictionary, Resource, and Exchange User's Guide; One Point Directory, Resource, and Exchange Administrator Guide; Mission Critical Software, Inc.; 1995–1999.

* cited by examiner

*Primary Examiner*—Mehmet B. Geckil
(74) *Attorney, Agent, or Firm*—Myers Bigel Sibley & Sajovec

(57) ABSTRACT

Systems, methods and computer program products are provided for distributed administration of a network environment having defined administrator authorities. A plurality of rules are defined specifying ones of a plurality of entity objects without administrator authority authorized to invoke administration powers to establish properties of target entity objects. In various embodiments, such rules are based on one or more of the properties of the target ones of the entity. An administrator application identifies one of the rules associated with one of the administration powers for one of the properties to be established and obtains a property of the target entity object designated by the identified rule to determine if the action is authorized. The administrator executes the identified one of the rules to determine if the requesting entity object is authorized to invoke the associated administration power to establish the designated one of the properties of the target entity object and establishes the designated one of the properties of the target entity object if the requesting entity object is so authorized.

32 Claims, 18 Drawing Sheets

|  | Sales ActiveView (*_Sales) | Marketing ActiveView (*_Marketing) |
|---|---|---|
| NYC ActiveView | !General Properties<br>!Profile Properties<br>NYC_Sales Group | !General Properties<br>NYC_Marketing Group |
| HOU ActiveView | !Profile Properties<br>HOU_Sales Group | !No Powers<br>HOU_Marketing Group |

Setting UserUpdate powers for the Change Address Task

| First Name | Read | Last Name | Write |
| Address one | Write | | |
| Address two | Write | | |
| City | Write | | |
| State | Write | Zip Code | Write |
| SSN | Don't Show | AIDS Test Result | Don't Show |

FIGURE 15

Change Address

| First Name | Gene | Last Name | Allen |
| Address one | BFE | | |
| Address two | | | |
| City | Boonies | | |
| State | Texas | Zip Code | 77777 |

METHODS, SYSTEMS AND COMPUTER PROGRAM PRODUCTS FOR RULE BASED DELEGATION OF ADMINISTRATION POWERS

FIELD OF THE INVENTION

The present invention relates generally to administration of network environments, and more particularly to delegation of administrator powers in network environments.

BACKGROUND OF THE INVENTION

Enterprise computing is evolving from a centralized, mainframe-based model, to distributed client-server and Internet based computing. These trends generally are increasing the complexity of managing enterprise systems and infrastructures. Management challenges for such enterprise systems are further increased where the network environment includes features such as corporate web farms, large-scale intranets, e-Commerce applications, on-line customer relationships, remote sales offices, integrated business partnerships and extended supply chains. Such an extended enterprise network environment is schematically illustrated in FIG. 1. Thus, it is desirable for enterprise systems and applications to reach beyond the walls of the traditional enterprise definition. In light of these enterprise network environment trends, network administrators are increasingly challenged in their efforts to simplify administration tasks, increase security and reduce network costs.

Various approaches have been taken to expand upon the earliest models for network administration, such as various Windows products from Microsoft Corporation which provided for specific users with extensive administrative powers designated on the system as administrators while other users are denied access to these administrative powers. Thus, security and administration of the network environment in such products is provided by bifurcating users into administrators who have full administration authorities and users with no such authority.

Given the increased reliance on and complexity of the enterprise network environment, improvements to this basic administrator/user model have been provided in an attempt to allow controlled delegation of administrator authorities to designated users without requiring that such users be provided full administration powers and authorities over the network environment. Examples of such known approaches include the Windows 2000 Active Directory from Microsoft Corporation and the enterprise administrator previously offered by Mission Critical Software (now NetIQ Corporation) of Houston, Tex.

Active Directory is a feature supporting administration tasks. The Active Directory is a directory service that is integrated with Windows 2000 Server and offers hierarchical views, extensibility, scalability, and distributed security to business customers. The directory service is integrated with both Internet and intranet environments, provides intuitive naming for the objects it contains, scales from a small business to a large enterprise, works with familiar tools, such as Web browsers, and provides open application programming interfaces. In essence, Active Directory allows management of an enterprise environment by making a variety of objects be presented like a file directory.

To provide administrators with the power to create their own directory object types, the Active Directory is extensible through a schema mechanism. If a user has an important piece of information that the user wants to publish in the directory, he or she can create a whole new object type and publish it. For example, a wholesale distributor may want to create a warehouse object to put in its directory, with information that is specific to that business. New object classes can be defined and instances added.

The directory services themselves define a wide variety of classes. For example, the Active Directory provides standard objects for Domain, Organization Units (OU), User, Group, Machine, Volume, and PrintQueue, as well as a set of "connection point" objects used by Winsock, Remote Procedure Call (RPC), and Distributed Component Object Model (DCOM) services to publish their binding information.

The Active Directory provides an administration structure that allows for some decentralized administration generally without compromising security. Because each domain is a security boundary, multiple security boundaries are possible. With this design, administrators in domain A are not generally automatically administrators in domain B. The container hierarchy may be important where the scope of administration is the domain, and the administrator of a domain has authority over every object and service within that domain. The Active Directory grants privileges to users based on the specific functions they must perform within a given scope. Administrative scope can include an entire domain, a subtree of OUs within a domain, or a single OU.

With the Active Directory, large structures of users can be created in which each user can potentially access all of the information stored in the directory, but the security boundaries remain clear. Security boundaries can also be much smaller than domains. For example, when a user account is created, it is associated with a particular domain, but it can also be put into an organizational unit. Permission to create users in an organizational unit can be delegated, allowing someone to create users or other directory objects in one place only, with rights within that OU only. In addition, OU hierarchies can be created. The Active Directory provides specific permissions which can be delegated and restricted in scope. However, Active Directory still uses a static membership approach with Access Control List (ACL) based management. An ACL is a table which identifies access rights of a user to objects in Active Directory.

The Active Directory uses multimaster replication. Some directory services use a master-slave approach to do updates: all of the updates must be made to the master copy of the directory, and these are then replicated to the slave copies. This is generally adequate for a directory with a small number of copies and an environment where all of the changes can be applied centrally, but this approach does not typically scale beyond small-sized organizations, nor does it address the needs of decentralized organizations. Because the Active Directory offers multimaster replication, individual changes made in one copy of the directory are generally automatically replicated to other appropriate copies of the directory, whether connected via point-to-point or store-and-forward links.

Windows 2000 also provides a Security Configuration Editor designed to allow a user to perform configuration at a macro level. In other words, the editor allows a user to define a number of configuration settings and have them enacted in the background. With this tool, some configuration tasks can be grouped and automated using a macro-based station over the ACL-based Active Directory; they may, therefore, no longer require numerous, iterative key presses and repeat visits to a number of different applications to configure a group of machines.

Windows 2000 also provides Group Policy and Security Groups, which can be used to filter Group Policy by using membership in Security Groups and setting ACL permissions. Doing so enables processing of Group Policy Objects and allows Group Policy to be applied to Security Groups. By using ACLs and Security Groups, you can modify the scope of Group Policy Objects.

Finally, Windows 2000 provides a Microsoft Management Console (MMC) that is an (ISV)-extensible, common console framework for management applications. MMC itself does not supply any management behavior, but instead provides a common environment for Snap-Ins. Snap-Ins define the actual management behavior. Snap-Ins are administrative components integrated into a common host (MMC). The MMC environment may provide for seamless integration between Snap-Ins, even those provided by different vendors.

The Enterprise Administrator (EA) product also provided for some delegation of powers and automation of procedures to facilitate administration of an enterprise network environment. More particularly, EA provided rules based delegation of powers to users to allow for limited delegation of administrator powers to various users. A set of pre-defined policy rules were also provided to control the exercise of such powers by authorized users in accordance with the established policies. However, the delegation rules were based on the identification of the entities (such as users) requesting the exercise of the administrator powers and the target object to be affected. Like Active Directory (which uses ACL tables), the properties of the target object were not accessed for use in determining the authority of the requesting entity. In addition, EA did not support seamless customization of policies by a customer.

EA did support limited automation of procedures as well as delegation of powers. In other words, some grouping of tasks was provided for execution of requests by authorized users which complied with the policy rules. In particular, EA provided user exits. These exits were out of process, asynchronous command launches and were generally only performed after the associated operation had completed. The user exits essentially allowed running a batch command and had hard-coded parameters passed to the user program. They were also limited in that only specific operations could actually be extended, such as user create, user delete, etc. In addition, automation was supported for creating and deleting home directories and shares associated with the user create, update and delete operations.

Accordingly, a need exists for further capabilities to support delegation of administration powers in a network environment.

SUMMARY OF THE INVENTION

Embodiments of the present invention provide methods, systems and computer program products for distributed administration of a network environment having defined administrator authorities. A plurality of entity objects associated with the network environment are provided having an identifier and properties. The entity objects in at least some cases not having the administrator authorities of the network environment. A plurality of administration powers for the network environment are also provided which establish the properties of selected ones of the plurality of entity objects using the administrator authorities of the network environment. A plurality of rules are defined specifying ones of the plurality of entity objects authorized to invoke ones of the plurality of administration powers to establish properties of target ones of the entity objects. In various embodiments, such rules are based on one or more of the properties of the target ones of the entity. A request is received to establish one of the properties of a target one of the entity objects from a requesting one of the entity objects at an administrator application executing on the network environment.

The administrator application identifies one of the plurality of rules associated with one of the plurality of administration powers for the one of the properties and obtains the at least one of the properties of the target one of the entity objects designated by the identified rule. The administrator executes the identified one of the plurality of rules to determine if the requesting one of the entity objects is authorized to invoke the associated one of the plurality of administration powers to establish the one of the properties of the target one of the entity objects based on the obtained one of the properties of the target one of the entity objects and establishes the one of the properties of the target one of the entity objects if the requesting one of the entity objects is authorized.

In further embodiments the entity objects are file objects or are account objects, resource objects or exchange objects. Account objects may include users and the requesting one of the entity objects may be a user.

In other embodiments, active objects are defined which are each associated with a plurality of the entity objects. One or more of the rules specifies one of the active objects as a target one of the entity objects. A wildcard identifier may be provided defining a criterion for one of the properties and at least one of the rules may associate the wildcard with the requesting entity object to designate a property of the target entity object used to determine if the requesting one of the entity objects is authorized to invoke the associated one of the administration powers to establish properties of the target entity object based on the one of the properties associated with the criterion. The account objects may have a property designating one of the users as a manager and the wildcard identifier may authorize designated managers of account objects to invoke the associated administration power of the rule associating the wildcard with the requesting one of the entity objects.

In further embodiments of the present invention, a plurality of policy objects are provided constraining invoking of ones of the administration powers by authorized entity objects. Operations for establishing the one of the properties of the target entity object are preceded by determining if any of the plurality of policy objects apply to the request based on the requesting one of the entity objects, the target one of the entity objects and/or the one of the properties of the target one of the entity objects to be established. It is determined if policy objects which apply are satisfied and the one of the properties of the target one of the entity objects is established if the policy objects which apply are satisfied. The one of the properties of the target one of the entity objects in various embodiments may be established if all or any one of the policy objects which apply are satisfied. One or more of the policy objects may be associated with a user defined script which is invoked if the policy object applies. The user defined script may populate the request to allow establishing the one of the properties of the target entity object.

In other embodiments of the present invention, a plurality of trigger scripts are provided at least some of which include one or more of the administrator authorities and at least one other executable action to be invoked. A trigger script associated with a received request is invoked to establish a property of a target entity object. The trigger scripts may be revokable and actions performed by the invoked trigger script may be revoked if an error is encountered during execution of the invoked trigger script.

In further embodiments of the present invention, a plurality of rules are defined which provide constraints on invoking associated ones of the administration powers based on a requesting one of the entity objects. The entity objects may be file objects and one of the administration powers may be to establish permissions for files. One or more rules may be defined which authorizes requesting entity objects to establish permissions over a file for one or more of the target entity objects for either only a subset of user entity objects or only a subset of file permission characteristics. In various embodiments, the entity objects are account objects including users and one of the administration powers establishes a user storage quota. One or more of the rules establish limitations on a range of values which may be provided as a user storage quota by a requesting entity object.

In further embodiments of the present invention, the entity objects are account objects and properties of one or more of the account objects are administered by more than one application program. Virtual property objects are provided linking respective properties from one of the application programs to another of the application programs so as to present properties from the one of the application programs and the another of the application programs to a requesting one of the account objects without distinguishing the application programs administering the properties. The virtual property objects may be provided by an administrator application executing as a server application on the network environment.

In other embodiments of the present invention, systems are provided for distributed administration of a network environment having defined administrator authorities. A plurality of entity objects associated with the network environment are provided which have an identifier and properties. Various of the entity objects do not have the administrator authorities of the network environment. A plurality of administration powers for the network environment are provided which establish the properties of selected ones of the entity objects using the administrator authorities of the network environment. A plurality of rules are provided specifying ones of the entity objects authorized to invoke ones of the administration powers to establish properties of target entity objects based on one or more properties of the target entity objects. A presentation layer receives a request to establish one of the properties of a target one of the entity objects from a requesting one of the entity objects and provides information to the requesting one of the entity objects.

A business layer identifies one of the rules associated with one of the administration powers for the one of the properties, obtains the at least one of the properties of the target entity object designated by the identified rule from a data layer, executes the identified one of the rules to determine if the requesting entity object is authorized to invoke the associated one of the administration powers to establish the one of the properties of the target entity object based on the obtained one of the properties of the target entity object and establishes the one of the properties of the target entity object through the data layer if the requesting one of the entity objects is authorized. A data layer interfaces the business layer to resources of the network environment and obtains the at least one of the properties of the target entity object designated by the identified rule responsive to a request from the business layer and establishes the one of the properties of the target entity object responsive to the business layer.

While described above primarily with reference to methods, systems and computer program products are also provided.

BRIEF DESCRIPTION OF THE DRAWINGS

FIG. 2 is a schematic block diagram illustrating overlapping territories (active views) and cumulative powers according to embodiments of the present invention;

FIG. 14 is a schematic diagram of a user interface screen according to embodiments of the present invention;

FIG. 15 is a schematic diagram of a further user interface screen according to embodiments of the present invention;

DETAILED DESCRIPTION OF THE INVENTION

Figure 1:
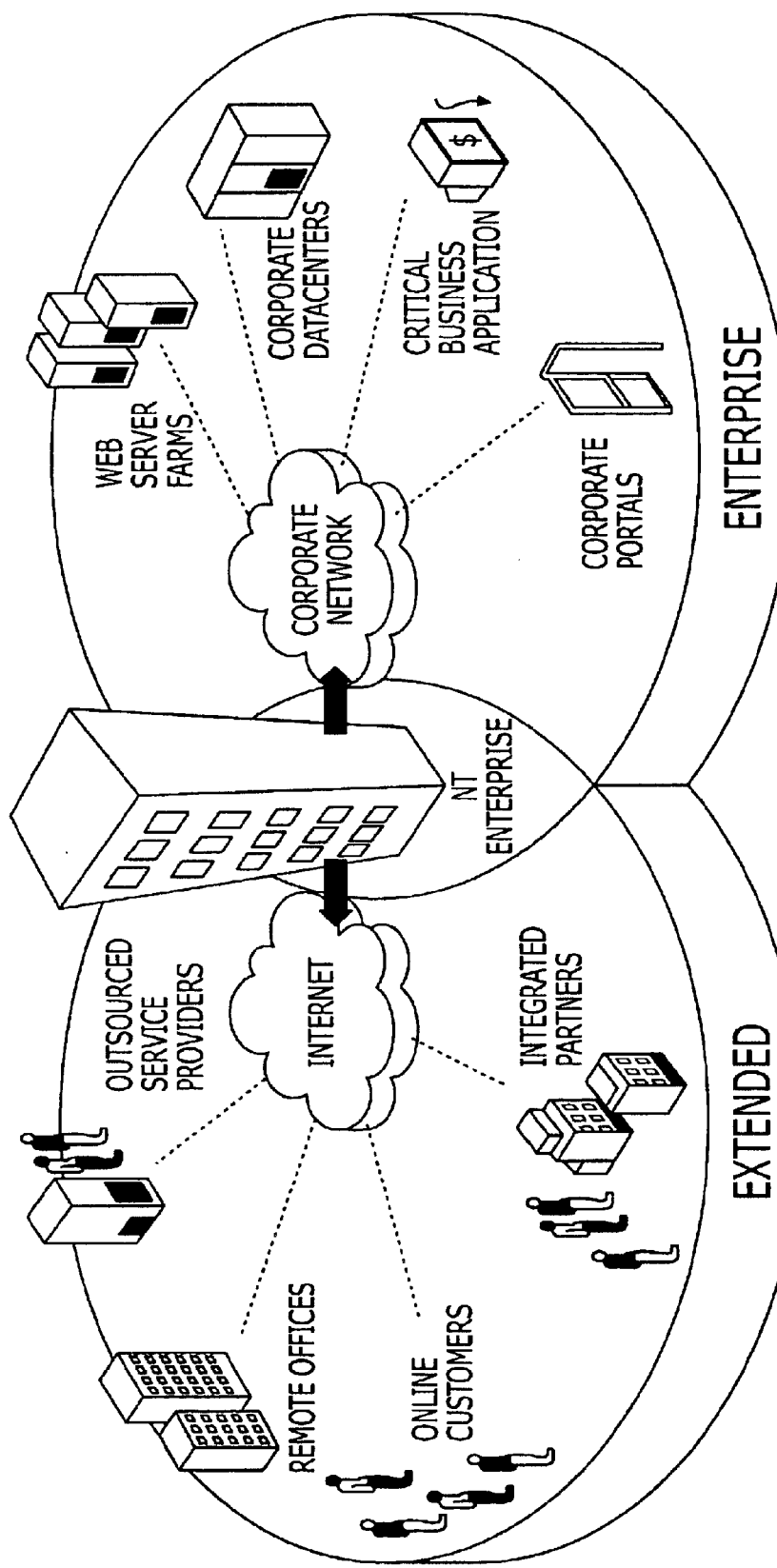
FIG. 1 is a schematic diagram of an enterprise network environment in which rule based distributed administration according to embodiments of the present invention may be implemented.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or assembly language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

In various embodiments of the present invention, the rule based structure for delegation essentially comprises who (requesting entity) can do what (administration power/subset of administration power/constrained administration power all generally referred to herein as administration power) to whom (target objects). The target objects may be grouped into territories (or active views) for purposes of implementation of the rules. Furthermore, multiple territories may represent some of the same objects. As a result, the powers delegated to a requesting entity may be considered cumulative over target entity objects, such as user accounts, groups, organizational units (OU), contact or resource, based on the overlapping of territories for which a requesting entity is provided particular powers and which contain the various target objects. In other words, if more than one territory or active view represents an object, a deputy (assistant administrator) may be delegated roles in more than one of these active views and provided the cumulative set of all the defined powers over objects in these active views.

This concept is illustrated in FIG. 2 which shows sales and marketing active views overlapped by geographic active views for New York City and Houston. The concept of overlapping powers is further illustrated by the noted example where a particular entity object has been delegated general properties in the New York City active view and profile properties in the sales active views. As shown in FIG. 2, this has the affect of granting the entity object both general and profile properties powers over the NYC_Sales group. The NYC_Sales group is represented in both the NYC_ *Active view and the_Sales Active View. The delegated power entity has general properties powers from the NYC_ *Active View and the profile property powers from the *_SalesActiveView. Thus, the delegated authority has powers granted in all active views that represent a group (or object). In addition, the user has general property powers over the NYC_Sales Marketing group, only profile property powers over the HOU_Sales group and no powers over the HOU_Marketing group.

Figure 3:
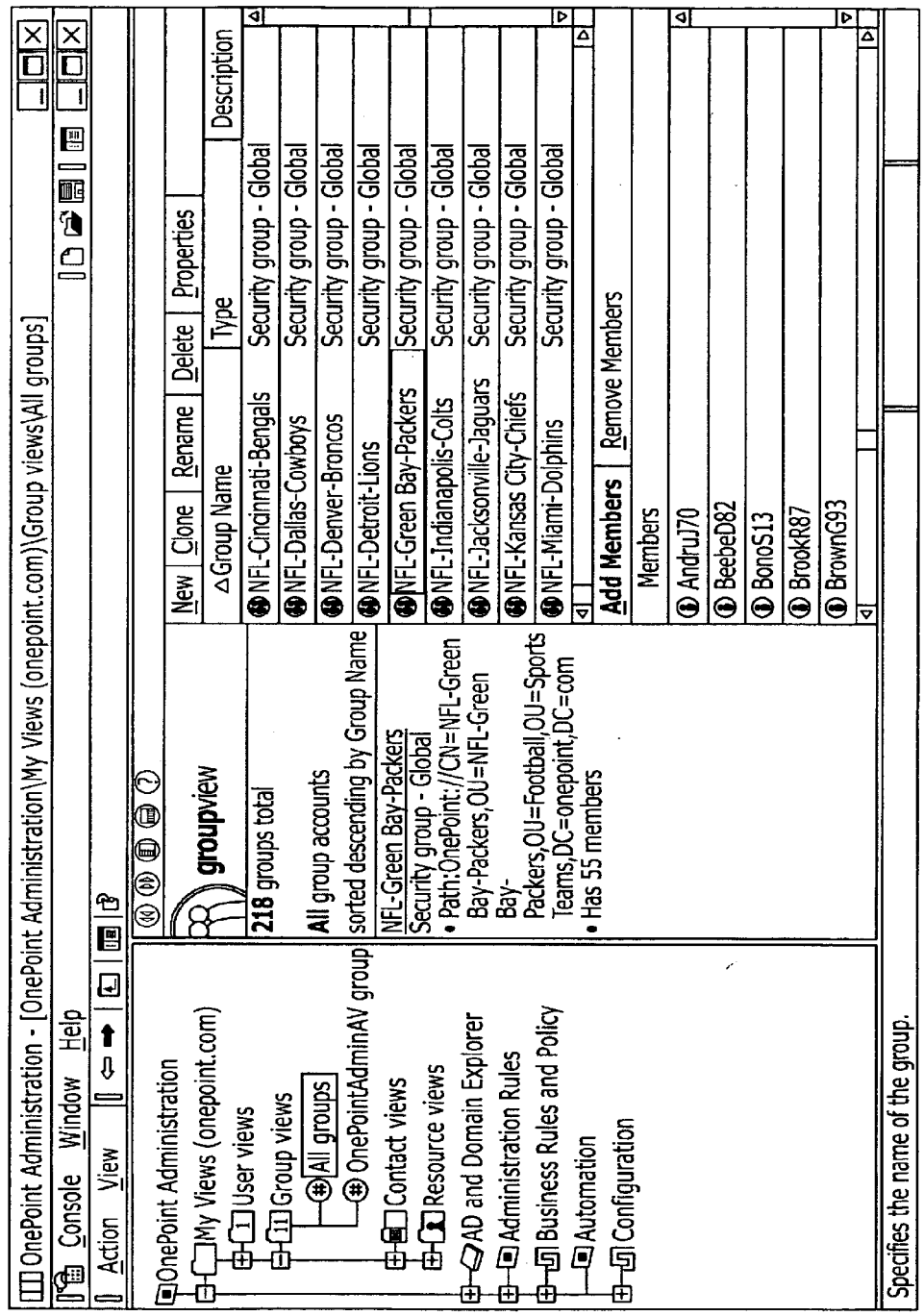
FIG. 3 is a schematic diagram of a client interface window according to embodiments of the present invention.

An exemplary browser type user interface for allowing communication to the distributed administration application of the present invention in various embodiments is illustrated in FIG. 3. Such interfaces may be provided to allow the management capabilities of underlying systems, such as Windows NT user manager, server manager, print manager and various Windows 2000 features, to be accessed through a single type interface to facilitate implementation of delegated administration. The information presented to the user may be selected consistent with the task to be performed and the authorities of the user. For example, the interface in FIG. 3 could be provided as a web console executing on remote locations throughout the enterprise environment or otherwise having access to the enterprise environment rather than being placed on the server supporting distributed directory and resource administration (DRA) in accordance with embodiments of the present invention.

As shown in FIG. 3, the left half of the view creates a Windows Explorer™ type directory structure for selecting information to view, which selected information is presented in a web type environment on the right hand side. In the illustrated example, all groups accessible to the user have been selected on the left hand portion and are displayed on the right hand portion with a breakdown of groups by name and underlying members within a group allowing changes to be made to the associated territories defining members of the groups along with additional summary information on the highlighted group (NFL-Green Bay-Packers).

Figure 4:
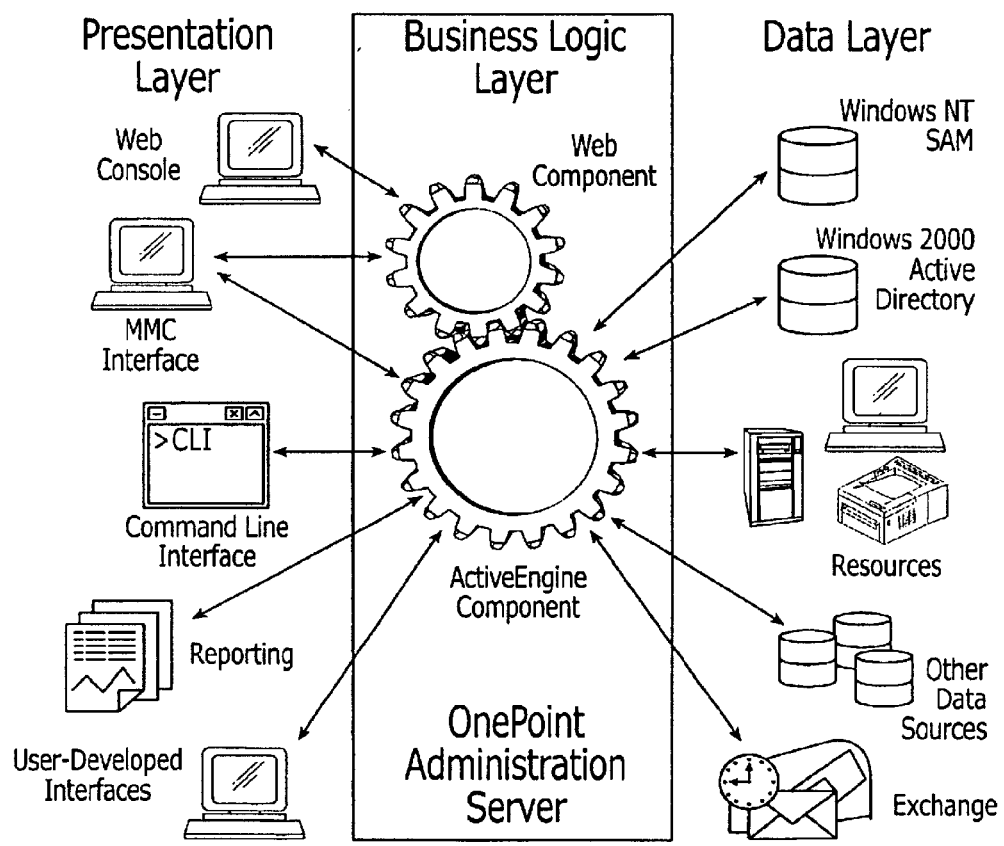
FIG. 4 is a schematic block diagram of a system for distributed administration according to embodiments of the present invention.

A schematic diagram illustrating a conceptual layout of component elements for embodiments of distributed administration according to the present invention will now be described. As shown in FIG. 4, systems according to the present invention may be broken out into three layers including a presentation layer, a business logic layer and a data layer. The presentation layer may include interface applications to a user, such as a web console, MMC interface, a command-line interface (CLI), a reporting interface and other user-developed interfaces. Such interfaces will generally provide for accepting commands, displaying communications and providing results. For example, the command line interface may be provided for use by sophisticated users to access and apply powerful capabilities using single or batch commands, such as moving home directories for a large number of users with a single command. User developed interfaces may provide custom user interfaces that use the Active Directory Service Interface (ADSI) provider to communicate with the administration server business logic layer (identified as a OnePoint Administration Server in FIG. 4).

The business logic layer acts as a bridge between the presentation layer and the data layer. The business logic layer applies the rules of the present invention to determine whether a request is valid (authorized) before initiating requested actions. As shown in FIG. 4, the business logic layer is broken into a web component allowing access across, for example, an intranet through a web console interface or to the MMC interface. The web component, in turn, makes request for action to the active engine component and returns messages, where appropriate, back to the web console or the MMC interface. As shown in FIG. 4, the active engine component runs as a service under an account that has administrator permissions, for example, in the Windows NT and Windows 2000 managed domains. The active engine component may accept requests from the web component, the CLI, or the user developed interfaces which are processed if they are valid. The active engine component, in turn, manages the data layer components which provide the interfaces for retrieving or changing appropriate information responsive to valid requests.

The data layer of the system architecture may, for example, include Windows NT and Windows 2000 data sources. The data layer represents the interfaces to data sources which are managed by the business logic layer. They can be a wide variety of objects to be managed within an enterprise network environment. Dynamic and flexible management of data and data sources may be provided through suitable interfaces provided to the business logic layer by the data layer. Exemplary data layer interfaces are shown in FIG. 4 including a Windows NT SAM which provides user account, group and computer account information in Windows NT domains. The Windows 2000 Active Directory, as described above, provides the user account, group, contact, computer account and organizational unit (OU) information in Windows 2000 domains. The resources block represents hardware/events/session information and may provide information about, for example, computer, services, devices, shares, print queue, print jobs, connected users, open files and event logs in the enterprise network environment. The Microsoft Exchange information may provide information about mailboxes, distribution lists and security maintained by Microsoft Exchange. Some or all of these interfaces may be provided in embodiments of the present invention.

Other types of data sources may also be supported which provide other useful information about objects in the enterprise network environment to be managed. For example, a human resources data base could be managed by the business logic layer. Management could include importing information from these other data sources into, for example, properties of newly created user accounts managed by Windows 2000 active directory.

Figure 5:
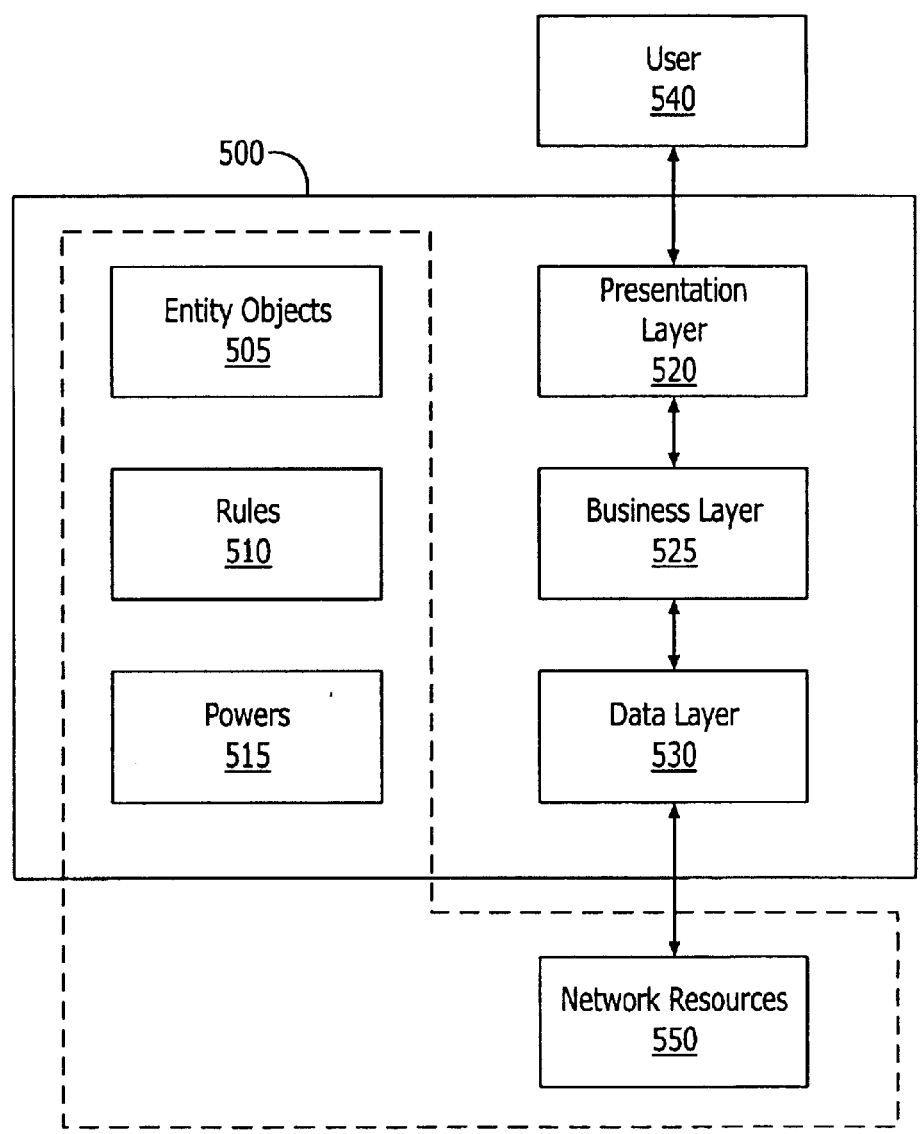
FIG. 5 is a schematic block diagram of a system for distributed administration according to further embodiments of the present invention.

Systems for distributed administration of a network environment having defined administrator authorities are illustrated in the block diagram of FIG. 5. As shown in the embodiments of FIG. 5, the system 500 includes entity objects 505, rules 510 and administration powers 515 which are used by the business layer 525 in providing for rule based delegation of administration authority in a network environment. The business layer 525 interfaces through a presentation layer 520 users 540 ones of which correspond to user types of entity objects 505. The business layer 525 further interfaces through the data layer 530 to the network resources 550. As is illustrated by the dotted line demarcation in FIG. 5, the entity objects 505, rules 510 and powers 515 may be maintained by network resources 550 in a manner so as to be available to the business layer 525 for management in the network environment.

The entity objects 505 associated with the network environment have an identifier and properties. While some of the entity objects 505 may be administrator authorities, various of the entity objects controlled by the business layer 525 do not have administrator authorities of the network environment. The administration powers 515 establish properties of selected ones of the entity objects 505 using the administrator authorities of the network environment. The plurality of rules 510 specify ones of the entity objects 505 authorized to invoke ones of the administration powers 515 to establish properties of target ones of the entity objects 505 based on one or more of the properties of the target ones of the entity objects 505.

The presentation layer 520 receives requests to establish designated properties of target entity objects 505 from a requesting one of the entity objects 505. Note that, as shown in FIG. 5, a user 540 interfaces through the presentation layer 520, for example, through a web console or MMC interface, which user is associated with one of the entity objects 505 (for example by entering an identifier as a log-in parameter). The presentation layer 520 further provides information to the user.

The business layer 525 identifies one or more of the plurality of rules 510 which are associated with one of the plurality of administration powers 515 for the designated property to be established. The business layer 525 also obtains the at least one of the properties of the target entity object 505 which criterion property is used by the rule in determining the authority of a requesting user. The criterion property is obtained by the business layer 525 utilizing the data layer 530 to interact with network resources 550 which maintain the properties of the entity objects 505.

The business layer 525 further executes the identified one or more of the plurality of rules 510 to determine if the requesting one of the entity objects 505 (corresponding to the user 540) is authorized to invoke the associated administration power 515 to establish the designated one of the properties of the target entity object 505. This determination is based, in various embodiments, on the obtained criterion property of the target entity object used by the rule to establish authority. However, in various further embodiments of the present invention, the rule need not be based on a criterion property associated with the target entity object. The business layer 525 further establishes the designated property of the target entity object through the data layer 530 if the requesting entity object 505 is so authorized.

The data layer 530, as noted above, interfaces the business layer 525 to the resources 550 of the network environment. The data layer 530 further obtains the criterion property or properties of the target entity object designated by an identified rule for use in determining the authority of the user 540 responsive to a request from the business layer 525. The data layer 530 further establishes the designated property of the target entity objects responsive to the business layer 525 by providing the interface between the business layer 525 and the network resources 550.

Figure 6:
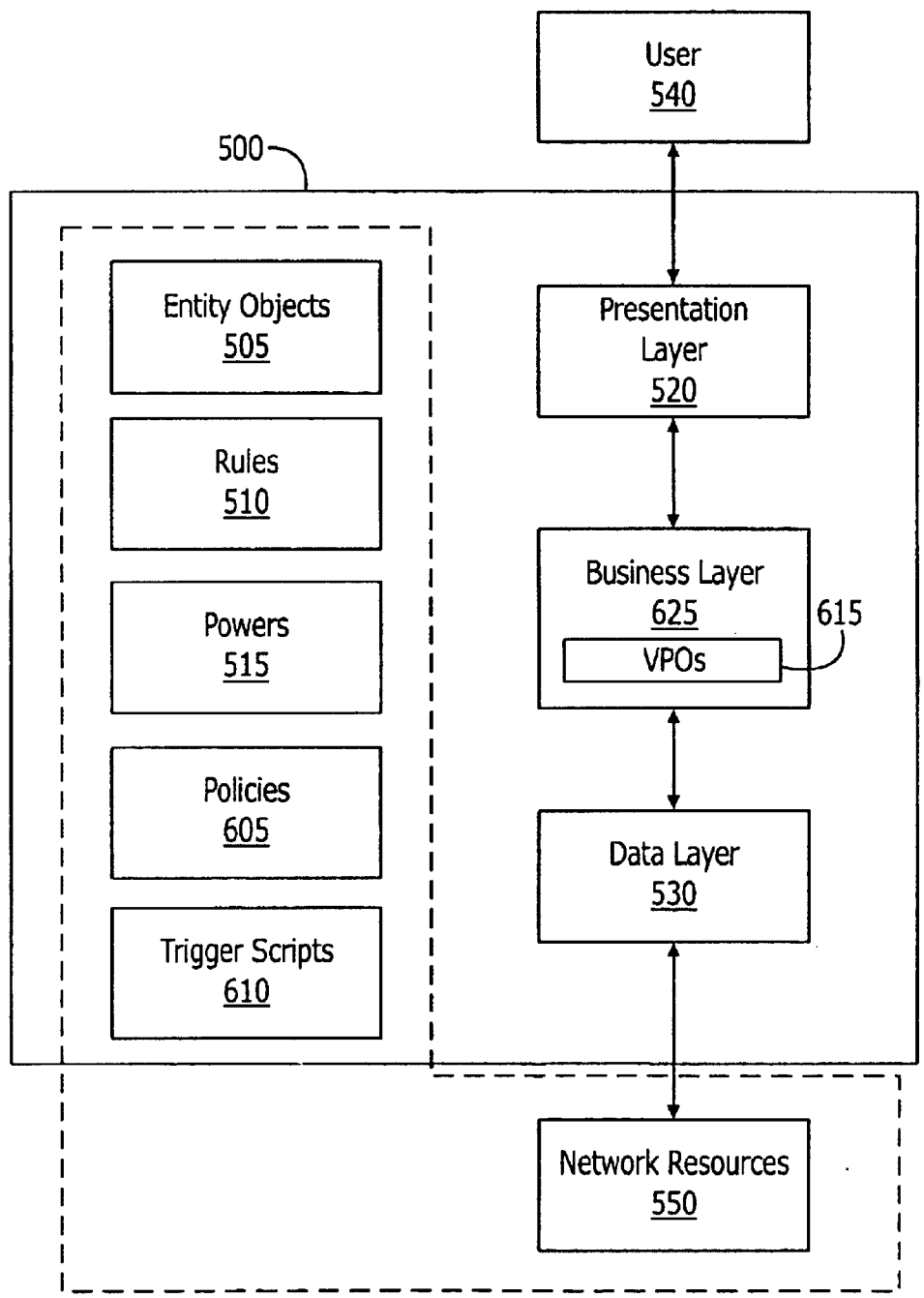
FIG. 6 is a schematic block diagram of a system for distributed administration according to yet other embodiments of the present invention.

Referring now to the block diagram illustration of FIG. 6, further embodiments for distributed administration of a network environment according to the present invention will now be described. Note that like numbered blocks in FIG. 6 operate essentially as described previously with reference to FIG. 5 and will not be described further herein. In the embodiments of FIG. 6, a plurality of policies (policy objects) 605, trigger scripts 610 and one or more Virtual Property Objects (VPOs) 615 are illustrated. The business layer 625 interfaces with the policy objects 605, the trigger scripts 610 and the VPOs 615 in implementing distributed administration of the network environment as well as interfacing with the entity objects 505, rules 510 and administration powers 515 and the presentation layer 520 and data layer 530 as described previously with reference to FIG. 5.

The policy objects 605 constrain invoking ones of the administration powers 515 by authorized ones of the entity objects 505. The business layer 625 determines, before establishing a designated property of a target entity object, if any of the policy objects 605 apply to a request. This determination may be based on one or more of the requesting one of the entity objects, the target one of the entity objects and the designated property of the target one of the entity objects to be established. The business layer 625 further determines if any identified policy objects which apply are satisfied. The designated property of the target entity objects is then established only if the requesting entity object is authorized and the policy objects which apply are satisfied. Note that, in various embodiments, where a plurality of policy objects apply to a request, they may be provided so as to require all such policies to be satisfied or any one of the policies to be satisfied and variations thereon.

One or more of the policy objects 605 may be user defined scripts executed by the business layer 625 when they apply. Thus, a user defined script may provide for seamless customization of distributed administration rules and policies within the network environment. The user defined scripts may not only determine whether a policy is satisfied but may also operate to populate a request in a manner which allows establishing the designated property of the target entity object. For example, a request for a user update may require information from a human resources (HR) database regarding the target entity, which information may be obtained by the user defined policy script.

One or more of the trigger scripts 610, as illustrated in the embodiments of FIG. 6, may include executable actions relying on administrator authorities as well as at least one other executable action. The combination of these actions is invoked responsive to a request from an authorized user 540 to change a property of a target one of the entity objects 505. In such embodiments, the business layer 625 invokes trigger scripts associated with a received request responsive to the request where the user is authorized and, in some embodiments, where associated policy objects are met. Furthermore, various of the trigger scripts 610 may be revokable and the business layer 625 may operate to revoke actions performed by an invoked trigger script if an error is encountered during execution of the invoked trigger script.

The VPOs 615 may be utilized in embodiments of the present invention where properties of one or more of the entity objects 505 are administered by more than one application program. The VPOs 615 may be provided to link respective properties from one of the application programs to another of the application programs so as to present properties from both such application programs to a requesting user 540 without distinguishing the programs administering the properties. Furthermore, as shown in FIG. 6, the VPOs are provided by the business layer application program 625 which executes as a server application in the network environment. The presentation layer 520 may interface with a user application 540 executing as a client application to interface with the business layer 625.

Figure 7:
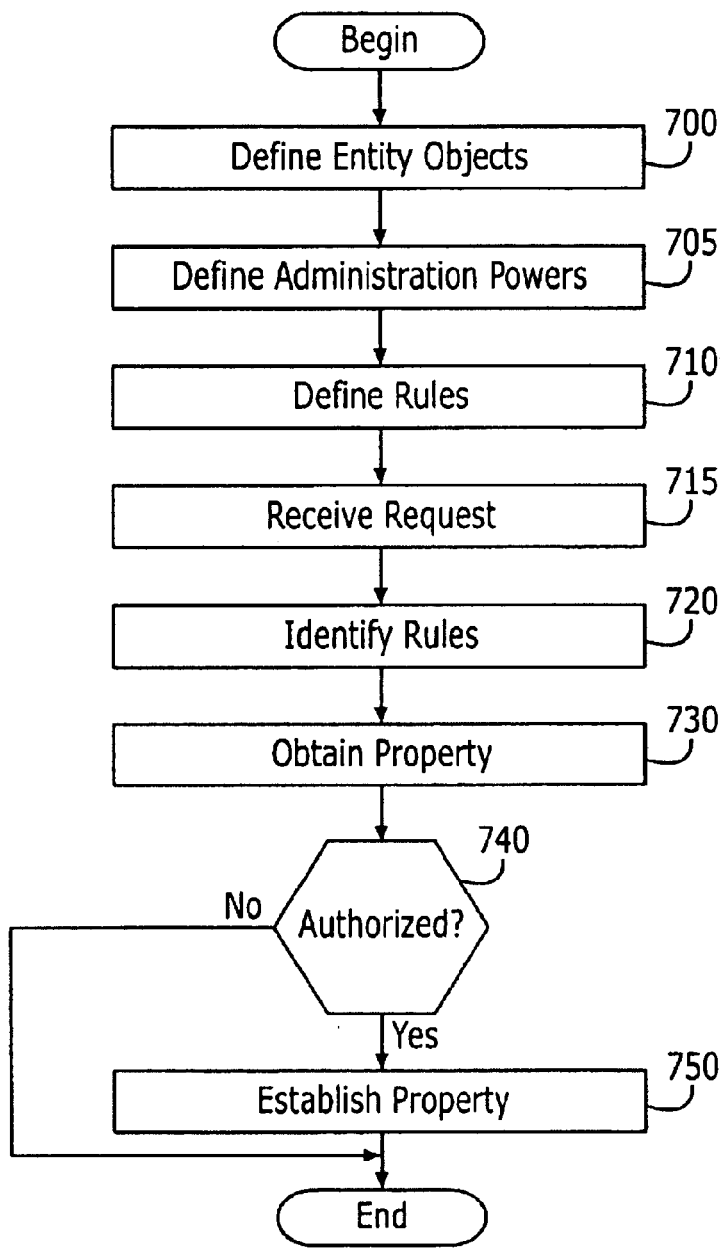
FIG. 7 is a flow chart illustrating operations for distributed administration according to embodiments of the present invention.

Operations for distributed administration will now be further described with reference to the flowchart illustration of FIG. 7. Operations for distributed administration of a network environment having defined administrator authorities begin at block 700 with defining of a plurality of entity objects associated with the network environment. The entity objects have an identifier and associated properties. More particularly, while some of the entity objects in the network environment will generally be the administrator authorities of the network environment, various of the entity objects referred to herein will not have such administrator authorities but will instead be provided rule based delegated authorities as described herein.

The defining of the various entity objects to be managed in accordance with the present invention will generally be provided by identification of the entity object as established and maintained in the network environment by other applications. However, operations in defining a plurality of entity objects may include introducing new managed types of entity objects into the network environment. Examples of entity objects suitable for use with the teachings of the present invention include account objects, such as users or groups, resource objects, such as printers or scanners, and exchange objects, such as those supported by the Microsoft Exchange application. Entity objects may also be file objects such as files or directories. Furthermore, as will be described further herein, active objects may also be defined which provide territories (active views) associating different ones of the other types of entity objects into groupings. Such active objects may be designated as target ones of the entity objects covered by delegation in rules as will be described herein.

A plurality of administration powers are also defined for the network environment (block 705). The administration powers provide the ability to establish the properties of various ones of the entity objects and they are generally associated with the administrator authorities of the network environment. For example, in a Microsoft Windows environment, certain users are typically designated as being administrator authorities and have access to a variety of supported administration powers for administration of the network. However, as used herein "administration power" includes such authorities, subsets or accumulations of such authorities, or constrained versions of such authorities, which provide defined administration powers which may be delegated to authorized requesting users for establishing properties of target ones of the entity objects as will be described herein. Accordingly, operations at block 705 may include identifying existing administration powers provided by an underlying network operating system or other applications or variations thereof defined in accordance with the teachings of the present invention.

A plurality of rules specifying entity objects authorized to invoke ones of the administration powers to establish properties of target ones of the entity objects are defined as well (block 710). More particularly, for the embodiments illustrated in FIG. 7, at least some of the rules determine whether the requested administration power can be invoked based on one or more of the properties of the target entity objects. For example, a rule may allow managers to change the passwords of their employees. The corresponding user account objects for the respective employee may include a field (containing a property) specifying the manager for each such user. Thus, a corresponding rule would be based on a property contained in target ones of the user account entity objects as the designated manager would have authority delegated to change the user's password while other user account objects, without status as a manager, may not have such authority. Of course, while the manager authority over user passwords for his employee rule may not allow non-supervisors to change this property, it is to be understood that other ones of the rules may provide different criteria allowing requesting entity objects to change these passwords based on different rule criteria. Furthermore, it is to be understood that in the illustrated embodiments of the present invention, while a plurality of rules based on a property of the target entities are provided, other rules may be included which do not rely on such properties of the target entities.

Operations will now be described with reference to one invocation of authority to establish properties for the illustrated embodiments of the present invention in FIG. 7. Thus, a request to establish one of the properties of a target one of the entity objects is received by an administrator application which may be executing on a server in the network environment (block 715). One or more of the rules associated with one of the administration powers for the property to be established is identified (block 720). For example, if a user is requesting a change to another entity's password, password update powers of an administrator authority will be utilized and rules providing delegated authority to invoke such powers are identified.

Properties of the target entity object designated by the identified rule(s) are obtained (block 730). If the requesting entity object (user) is authorized (block 740), the designated property of the target one of the entity objects is established (block 750). The identified ones of the rules are executed to determine if the requesting one of the entity objects is authorized to invoke the associated one of the plurality of administration powers to establish the designated property of the target one of the entity objects based on the obtained criterion property of the target one of the entity object used to determine the authority (block 740). Furthermore, it is to be understood that, in various embodiments, once a single identified rule granting the authority is identified, additional identified ones of the rules need not be executed before establishing the property as requested.

Figure 8:
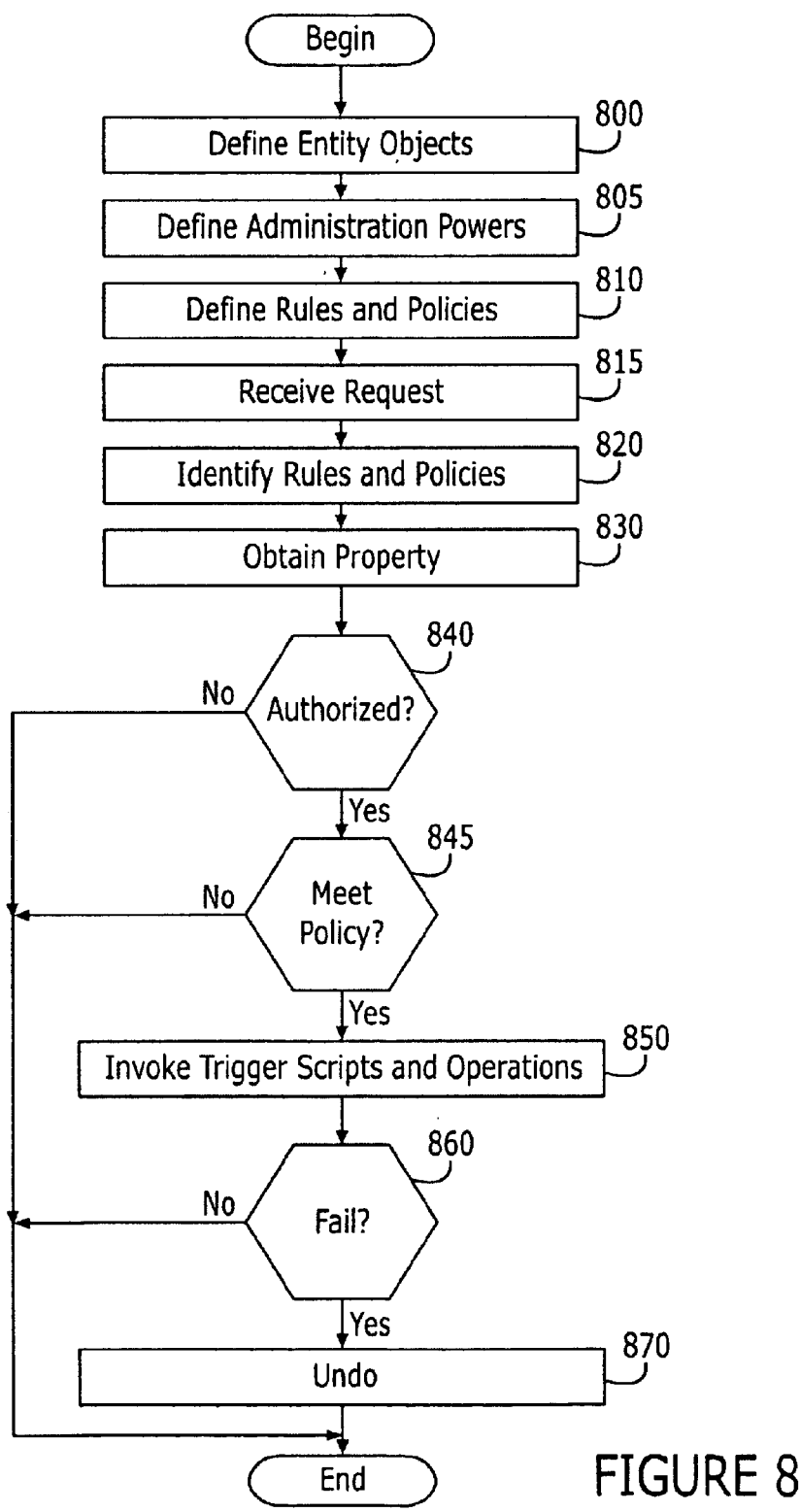
FIG. 8 is a flow chart illustrating operations for distributed administration according to further embodiments of the present invention.

Operations for distributed administration of a network environment according to further embodiments of the further invention will now be described with reference to FIG. 8. Operations for blocks 800–840 proceed substantially as described previously with correspondingly numbered blocks of FIG. 7. However, operations in the embodiments of FIG. 8 further utilize a plurality of policy objects constraining invoking of the administration powers by authorized users (block 810). It is further determined if any of the plurality of the policy objects apply to the request based on the requesting entity object, the target one of the entity objects and/or the property of the target one of the entity objects to be established (block 820). Thus, operations at block 820 include determining which policies as well as which rules apply to the received request. If the requesting user is authorized (block 840), it is determined if the policy objects which apply to the request are satisfied (block 845).

In various embodiments of the present invention, all of the policy objects which apply must be satisfied. In alternative embodiments, a fewer number, such as any, of the policy objects which apply need to be satisfied to meet the policy criteria at block 845. If a user is authorized (block 840) and the policy conditions are satisfied (block 845), the target property of the target one of the entity objects is established as requested (block 850).

Optionally, operations for carrying out the establishing of the property may utilize one of a plurality of trigger scripts provided. The trigger scripts include the administrator authorities as to one of the administration powers to allow execution of the requested action item but further include at least one other executable action to be invoked as part of the operation at block 850. Furthermore, in various optional embodiments of the present invention as illustrated in FIG. 8, revocable trigger scripts may be provided. Thus, if any of the activities at block 850 result in a failure condition (block 860), actions performed by the invoked trigger scripts at block 850 are revoked (block 870). The trigger scripts may also be user defined to allow seamless customization to a particular network environment.

In various embodiments of the present invention, policy objects may be used to determine whether an operation can take place. Policy objects may define a set of conditions that must be true before an operation takes place. While a rule may grant a deputy (requesting entity object) the right to perform an operation using an administrator power, policy objects place restrictions on what a deputy can do during an operation. A policy object is, thus, for such embodiments, an object that passes or fails the operation. Such policy objects can check for valid values for properties of a managed object or run a script. Such policy objects may be defined and then attached to the desired objects. Examples of policies may include:

Binding of policy to a deputy
A deputy is only valid if the user is defined in the HR database as a manager
Binding of policy to a role (i.e. an association by name (such as Helpdesk) of a requesting entity object, such as a user, with a predefined set of administrator powers to facilitate application of rules to types of users rather than one by one to each user)
A role is only valid between the hours of 2 and 3 in the afternoon
Binding of policy to a managed entity object type (outside of a territory or active view definition)
All users must have be in buildings 1–12
Binding of policy to an operation (outside of territory definition)
User deletes can only be performed during working hours
Binding of policy to a territory (no associated deputy)
All users in an OU must be in building 12
Binding of policy to a deputy/territory binding
A deputy can only set the building to 12 for users in this territory Binding of policy to a sector Users are in this territory only if they have a valid entry in the HR database Furthermore, a policy object may include the following methods:

Configure: used for things like home directory. This is similar to the IDefine of a sector, in that the policy object is responsible for presenting its UI and gathering configuration data.

Persist: persists configuration information. As with the Idefine in a sector, the server is responsible for persisting the configuration data somewhere.

The definition of a policy object may also include the error text that will be sent to a user, or a comment that describes the policy which might not only include a policy description but also the reason the policy exists, and a contact person. These policy comments may be Rich Text or HTML.

The rules as provided at block 820 may operate using a wild card identifier. A wild card identifier may be defined which provides a criterion for one of the properties. For example, an asterisk could be used as a wild card identifier such as is commonly performed with find functions under various Windows operating system applications. One of the plurality of rules could associate the wild card with the requesting one of the entity objects so as to designate a property of the target one of the entity objects used to determine if the requesting one of the plurality of entity objects is authorized to invoke the associated one of the administration powers. By way of further example, account objects may have a property designating one of the users as a manager for the respective user account objects. The wild card identifier may then authorize designated managers of such objects to invoke a selected administration power.

In an alternative approach, a plurality of rules defined at block 810 may themselves provide constraints on invoking associated ones of the administration powers based on the requesting one of the entity objects. For example, the constraints could be imposed and defined as new administration powers governed by respective ones of the rules. By way of example, an administration power may establish permissions for files. Rules providing constraints on delegations of file permissions may authorize requesting entity objects to establish permissions over one of the files for one or more target entity objects for only a subset of user entity objects or, for only a subset of file permission characteristics. Thus, a manager could be provided the authority to give file read or write permissions to only those users working in the manager's department. Similarly, a manager may only provide the right to give read permissions, but not write permissions, to members of the manager's department. By way of further example, an administration power may establish a user storage quota and a constraining rule may establish an administration power including limitations on a range of values which may be provided as a user storage quota by a requesting entity object. For example, 150 megabytes could be established as a maximum user storage quota under the powers delegated to one or more managers in an organization.

Figure 9:
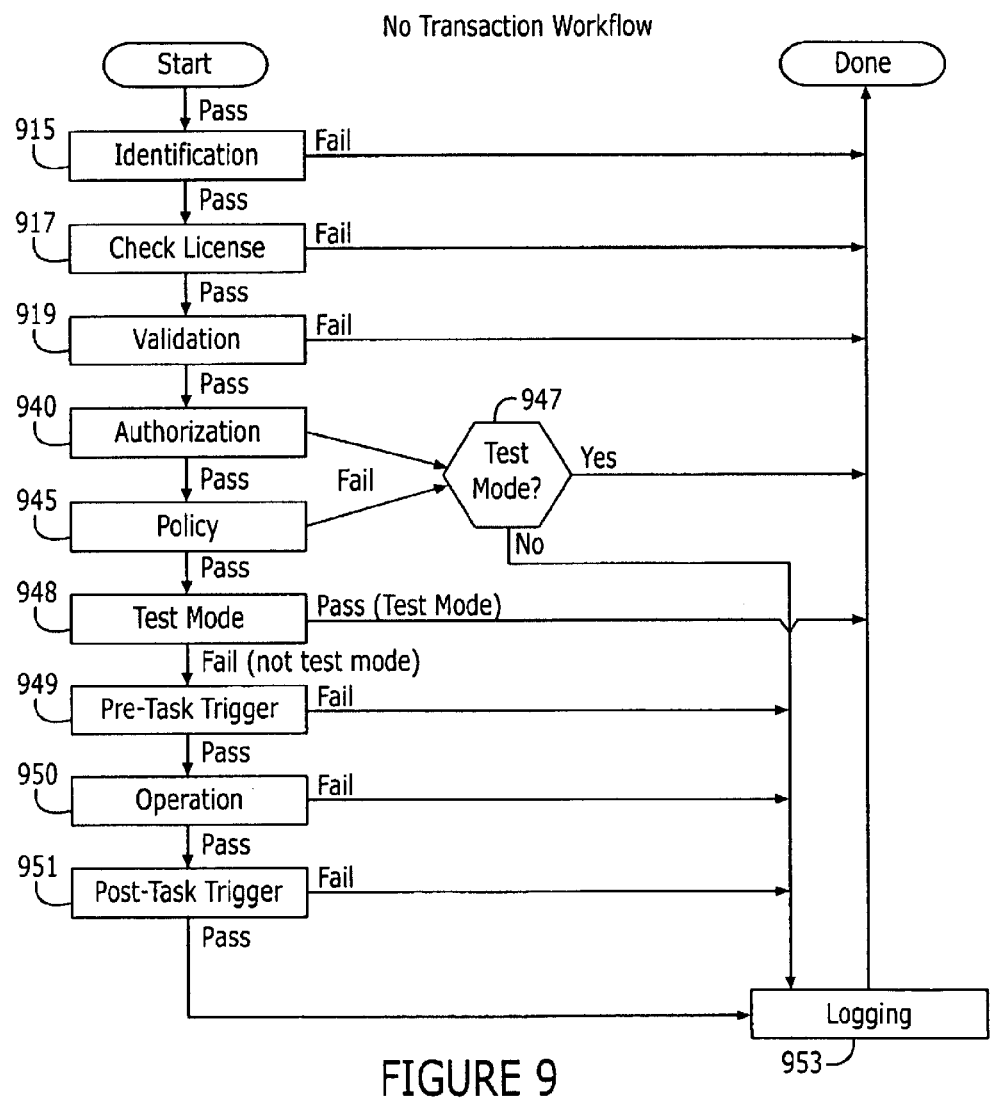
FIG. 9 is a flow chart illustrating operations for distributed administration according to further embodiments of the present invention.

Referring now to the flowchart illustration of FIG. 9, operations for distributed administration according to further embodiments of the present invention will now be described. As shown in FIG. 9, operations begin at block 915 wherein the administrator application receives a request for execution of a power and identifies the entity object (such as a user) requesting the action. Where appropriate, license information for one or more licensed applications in the network environment which will be utilized in executing the operation are checked to police proper usage of only licensed software in the network environment (block 917). Data passed with the request from the user may also be validated (block 919). For example, operations at block 919 may be directed to detection of syntax errors in a received request which are independent of the details of the operations to be executed. It is then determined if the requesting user is authorized in accordance with the rules based approach of the present invention (block 940) and whether any applicable policy conditions are satisfied (block 945).

As shown in the embodiments of FIG. 9, test mode events may also occur. Thus, if authorization fails at block 940 or a policy condition fails at block 945, it is determined if the request relates to a test mode operation (block 947). If not, the error event is logged at block 953. Similarly, if authorization and policy conditions are met during a test mode, then operations are completed with a pass indication (block 948).

Operations related to completing the requested task will now be described with reference to blocks 949–951 in which various operations such as those described with reference to blocks 750 and 850 previously are distributed across three separate operational steps. Pre-task trigger activities are first performed (block 949). Such activities may include preparatory work such as creating a directory on a designated storage media required for subsequent operations. If pre-task trigger activities fail at block 949, the failure is logged at block 953, otherwise, operations continue to block 950 to execute the underlying operations necessary to carry out the desired establishment of a property of a target entity (block 950). Again, failures are logged. If no failures are encountered, operations continue with post-task trigger activities (block 951). Such activities may include additional operations associated with the usage of the administrator power but not requiring use of that power. An example would be establishing a corresponding record on a human resources database when a new user is created using the administrator powers. Again, failures at block 951 are logged at block 953 as is successful completion of all operations.

Figure 10:
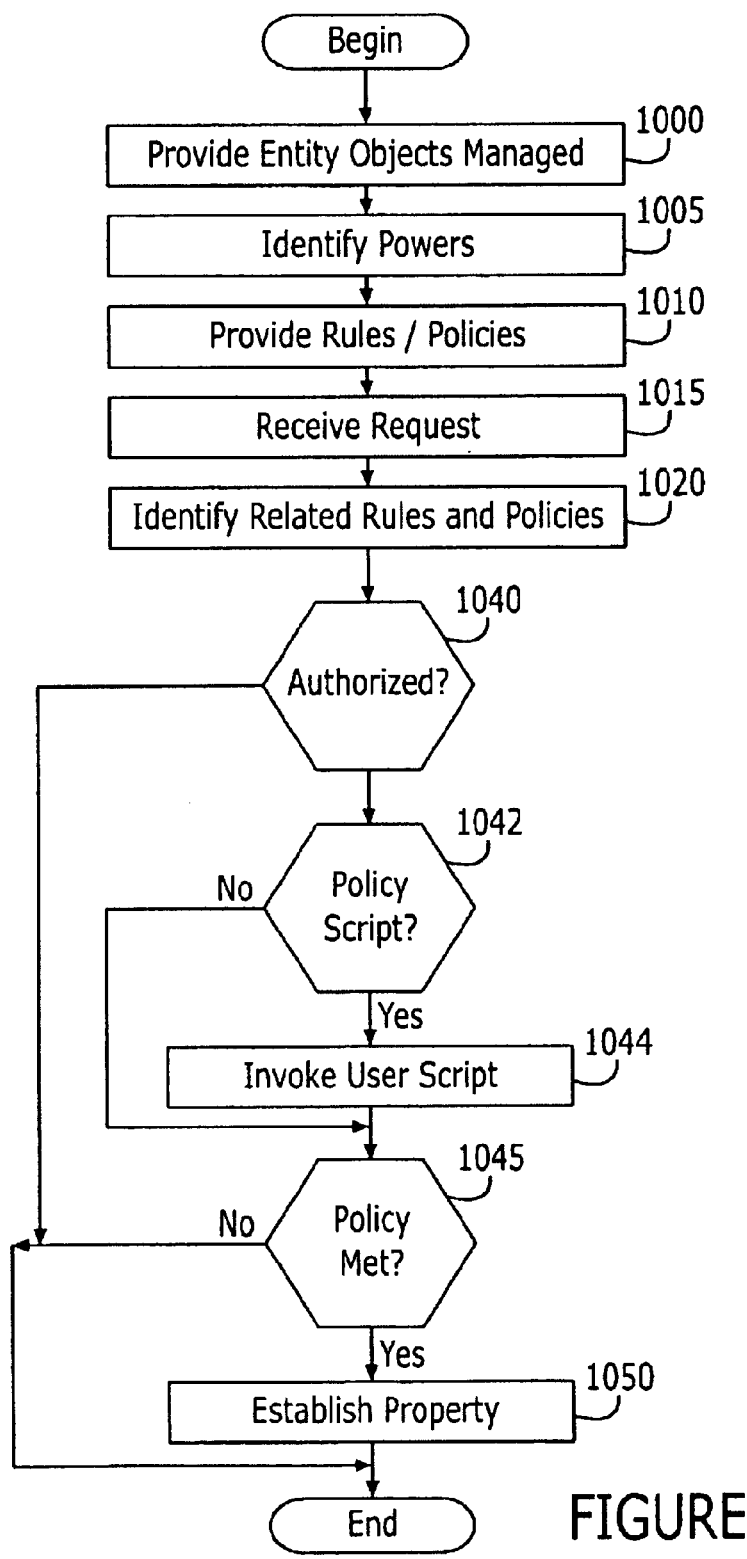
FIG. 10 is a flow chart illustrating operations for distributed administration according to further embodiments of the present invention.

Operations according to further embodiments of the present invention will now be described with reference to the flowchart illustration of FIG. 10. Note that correspondingly numbered blocks in FIG. 10 perform generally in the manner described with reference to similarly designated blocks in FIGS. 7 and 8 except as will be described herein. In particular, the rules as provided at block 1010 need not be based on properties of the target entities. Thus, once related rules and policies are identified (block 1020) and it is determined if the requesting user is authorized (block 1040) the embodiments illustrated in FIG. 10 determine if a policy associated with a user defined script applies (block 1042). Such user defined script based policies may be identified at block 1010, for example, by way of a pointer to an executable script provided by an administrator of the network environment.

Such user defined scripts may be beneficial in allowing seamless customization of different managed network environments which utilizes knowledge of administrator authorities for that network environment in defining the policies to be invoked in controlling delegated administration. Such user defined policy scripts may be integrated with the workflows of the present invention, for example, by simply providing a pass fail indication back to the work flows from the user defined policy script so that the overall work flow need not know the particular details of the user defined policy script. However, in various embodiments of the present invention, in addition to defining whether the policy condition has passed or failed, such user defined scripts may also be provided which populate the request from the user so as to allow establishment of the property of a target entity object as requested by the user.

If a user defined script is associated with an applicable policy (block 1042), the user script is invoked (block 1044). If the policy is met (block 1045) then the designated property of the target entity object is established (block 1050). Note that, as used herein, establishing a property may include creating, modifying and/or deleting the property.

Further embodiments of the present invention will now be described with reference to FIG. 11A in which correspondingly numbered blocks operate in substantially the manner described previously with reference to FIG. 10 except as will be described herein. In particular, for the embodiments shown in FIG. 11A, policies need not be provided at block 1110 or identified at block 1120.

Figure 11A:
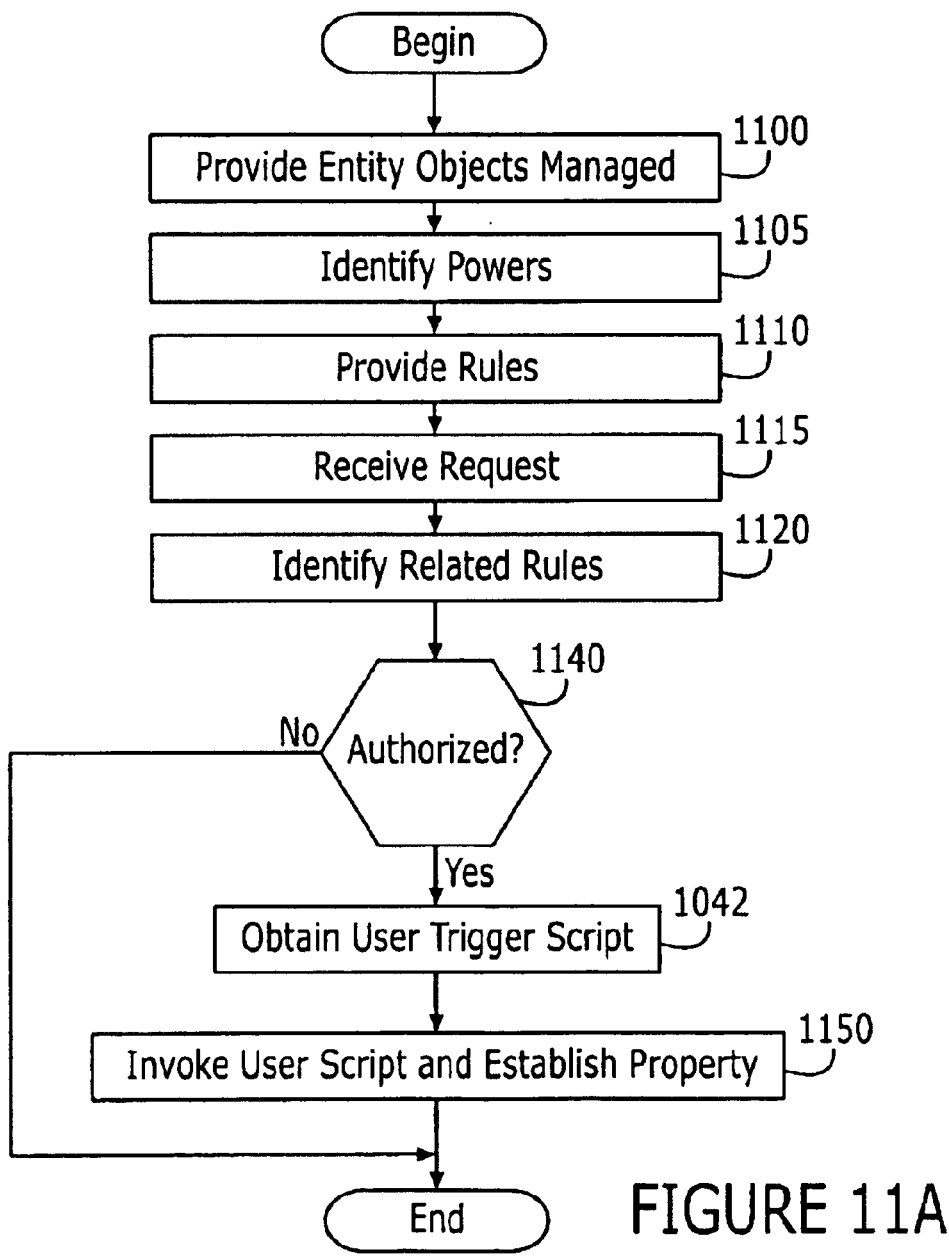
FIG. 11A is a flow chart illustrating operations for distributed administration according to further embodiments of the present invention.

The embodiments shown in FIG. 11A include user defined trigger scripts for establishing the designated property. At least one of the user defined trigger scripts includes an administrator authority action as well as at least one other executable action to be invoked (although they may be separated out as, for example, is shown in blocks 949–951 of FIG. 9 with the present invention integrating the user defined script with the base operation to provide the user defined trigger script). Such a user defined trigger script associated with a received request from block 1115 is obtained (block 1042) if the requesting user is authorized to do so (block 1140). The obtained user defined trigger script is invoked to establish the designated property of the target entity object (block 1150).

Figure 11B:
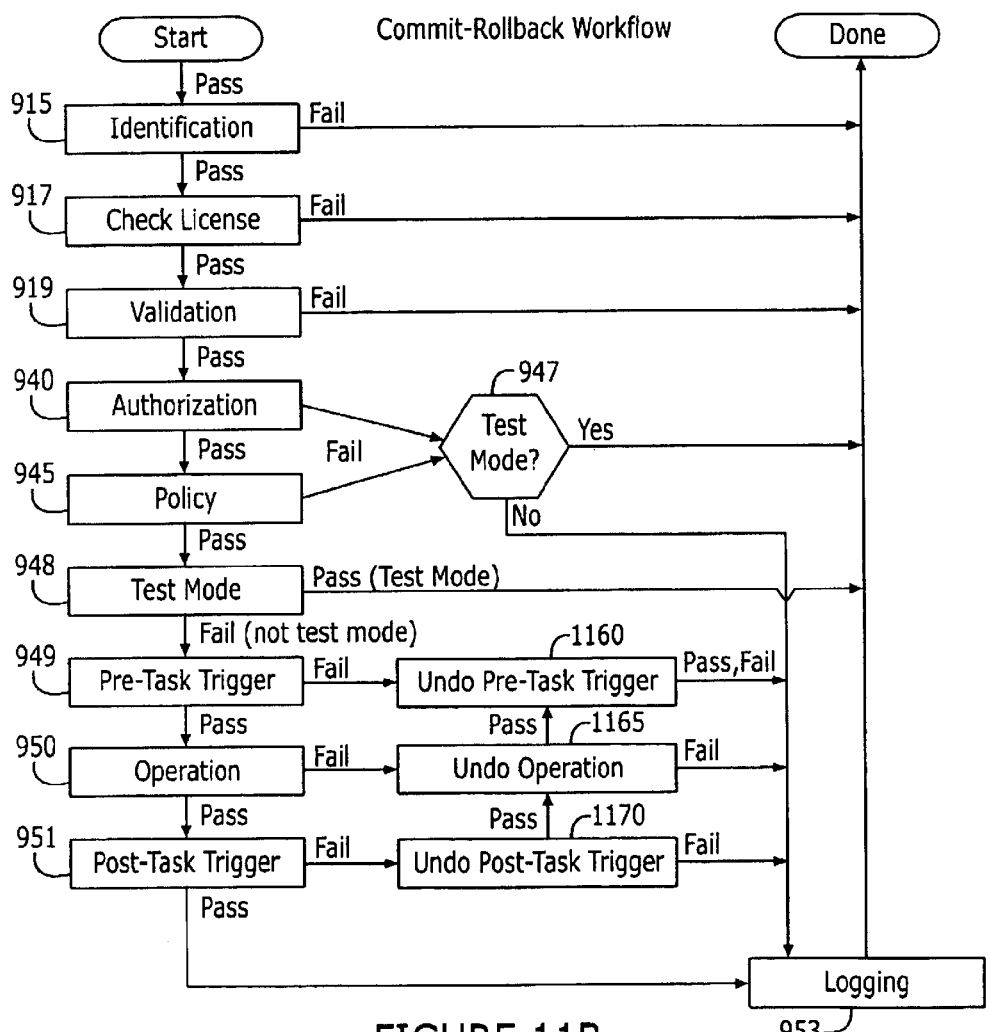
FIG. 11B is a flow chart illustrating operations for revoking actions after a failure according to further embodiments of the present invention.

Referring now to FIG. 11B, embodiments of the present invention including revokable trigger scripts will now be further described. Like numbered blocks in FIG. 11B operate as described previously with reference to FIG. 9 and will not be described further herein. Additional operations related to revoking a failed trigger script are shown at blocks 1160 through 1170. If a failure is encountered during pre-task trigger execution at block 949, operations to undo the executed pre-task trigger actions are, in turn, executed (block 1160). If a failure occurs during the operations at block 950, the corresponding undo operations at block 1165 are executed to undo such actions after which the pre-task trigger actions are also undone so as to revoke all executed activities for an uncompleted request (block 1160). Similarly, where the error occurs during the post-task trigger activities at block 951, the corresponding undo post-task trigger activities are executed (block 1170) and operations continue back through blocks 1165 and 1160 respectively to undo any already executed acts from an incomplete implementation of a request. Failures of any of the operations at blocks 949 to 951 as well as the success or failure of the corresponding undo operations at block 1160 through 1170 are shown in FIG. 11B as being logged at block 953. Thus, embodiments such as those illustrated in FIG. 11B provide for undoing any partial activities during an unsuccessful execution of a requested operation. This may provide for cleaner administration of the network environment.

Figure 12:
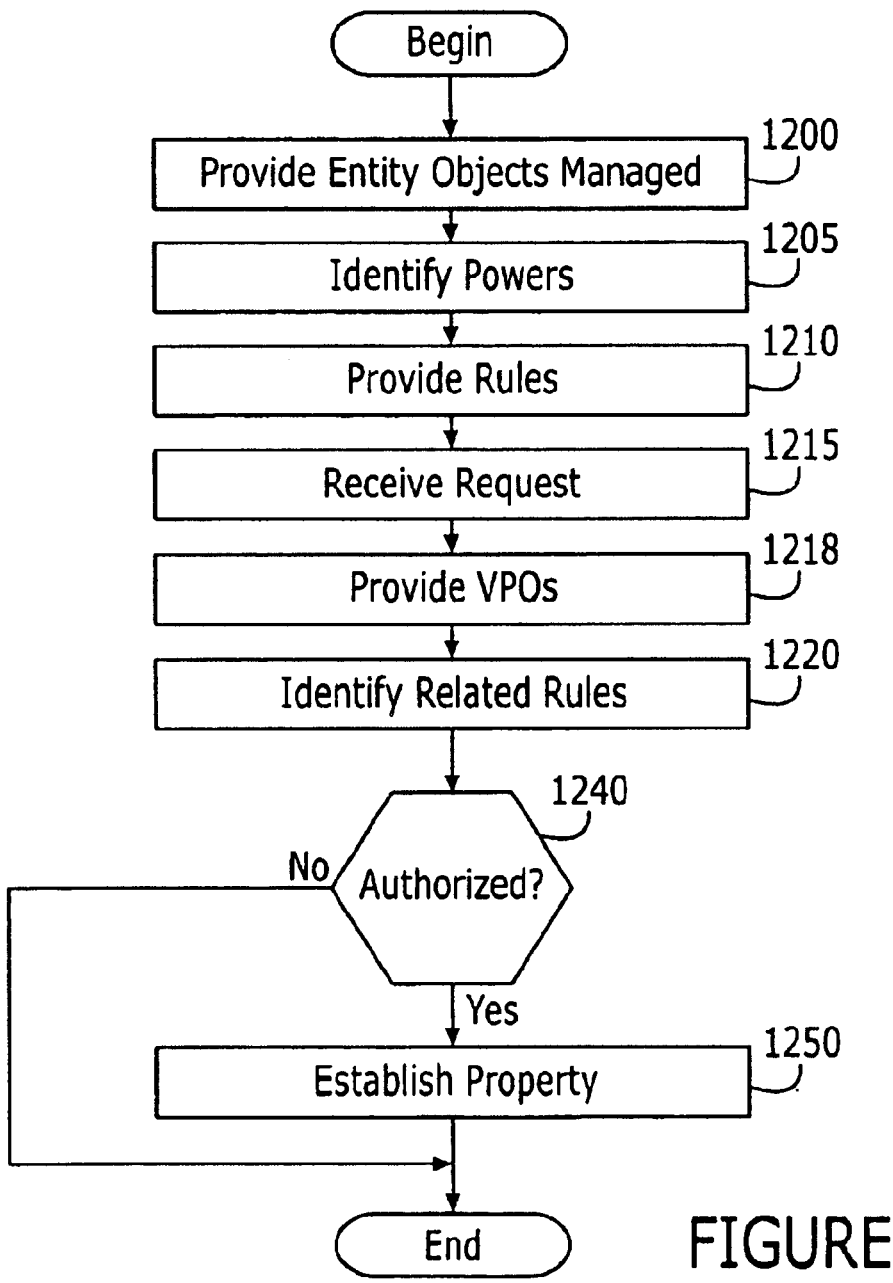
FIG. 12 is a flow chart illustrating operations for distributed administration according to further embodiments of the present invention.

Yet further embodiments of the present invention including virtual property objects as will now be described with reference to FIG. 12. Operations at blocks 1200 through 1215 proceed substantially as described previously for the correspondingly numbered blocks of FIG. 11A and will not further be described herein except to the extent they differ in the embodiments of FIG. 12. In particular, operations in the embodiments of FIG. 12 include providing virtual property objects (block 1218). More particularly, in the embodiments of FIG. 12, properties of at least one of the target entity objects are administered by more than one application program. For example, referring back to FIG. 4, a user may have a target disk usage allocation maintained by one of the other data sources as well as a variety of properties maintained by the Windows 2000 Active Directory. The provided virtual property objects at block 1218 link respective properties from one of the application programs to another of the application programs administering properties of the target entity object. This linkage is provided so as to present properties from each of the linked application programs to a requesting one of the entity objects, such as a user, without distinguishing the application programs administering the properties.

Various embodiments of the present invention have been generally described above. For purposes of further understanding of the present invention, a further explanation will now be provided with reference to an example implementation of the present invention in the remainder of this specification. This example is generally based on embodiments of the present invention developed by the inventors hereof which are marketed by NetIQ Corporation and identified generally as the directory and resource administrator (DRA) product. However, it is to be understood that the exemplary embodiments of the present invention described here are solely for the purposes of illustration and do not limit the scope of the invention as claimed herein.

By way of background, a policy may be based on the corporate rules used to enforce administration of the network. Automation is defined as "something" that happens automatically as a part of a command that has been issued. For example, creating a home directory may be created after someone does a create user. One problem with delegation of authority in the Active Directory is with enforcement of policies when administration is pushed out into an organization. A lack of policy enforcement may mean a lack of standards, which may mean still more complexity to manage. Without policy, a distributed network may become unmanageable.

DRA embodiments described in this section are implemented, in part, based on Microsoft Corporation's COM software technology. COM provides for openness and extensibility in the architecture of these embodiments of the present invention. Once an internal interface to a directory and resource administrator (DRA) system in accordance with embodiments of the present invention is stabilized through COM, new functions provided through that interface can be easily added. One or more COM objects conforming to a DRA COM interface standard could be registered with the system to extend functionality, in some cases, without requiring modifications to the base system. For example, a newly managed type, such as a public key, could be coded as one or more COM objects, including all functionality required to implement the new feature, such as configuration, persistence, operation, and display. These COM objects would implement the DRA specific COM interfaces, and would then integrate with the DRA base service and other DRA extensions without requiring changes to the base service or other extensions. In fact, these interfaces may be exposed to allow value added resellers (VARs) to add custom capabilities to manage new systems which may be important for a specific customer.

COM generally provides a higher level of modularity than was previously attainable using, for example, a statically-linked code. This has advantages for testing as well. Once a COM object has been thoroughly tested, it will generally be known to be reliable. A developer may develop an object test frame to support each object, which can be used as part of full regression testing after any system modification. Objects that expose automation interfaces can be fully tested using maintained test scripts. Modification to other parts of the system which interact with these COM components then will generally not introduce new bugs into these separately compiled components (although such changes could conceivably uncover latent bugs which have escaped earlier detection).

Various embodiments of the present invention as will now be described by way of example may support transaction support, rules based operations, policy driven operation, automation, delegation, enhanced logging/information, reporting (e.g., auditing, data mining), power tools, GUIs and extensions such as may be provided with a component based architecture. Base services may be provided in a server, for administrative request submission, authorization, policy enforcement, automation, delegation, and extensions. A variety of applications may be built on top of these base services without requiring modification to the base.

Support may be provided for client applications (such as extensible schemas). GUIs and CLI may host application-specific controls and components for customer interaction. The DRA applications may be units of field deployment; they will implement interfaces. This approach may support fast retrievals, primarily enumeration of objects, and reasonably fast processing of administrative actions. Various "objects" that make up the structure of DRA embodiments will now be described to briefly cover each model while leaving detailed descriptions of each object to the sections that follow. The following definitions will be used in describing these embodiments:

Managed Object—something that DRA manages, like Users, Groups or Files.

Operations—something that DRA does; most of the time this will be to a managed object, like delete or create on the Managed Object User.

Power—the ability to do the operation

Deputy (assistant administrator)—a user who has the power to do perform operations Marshal (administrator)—a user who has ALL powers Role—a group of powers Task—a combination of a power with an operation.

DRA is a tool that lets users manage objects. These objects are of various types and include both directory objects, like users and groups, and non-directory objects, like print jobs. In the described exemplary DRA architecture, each of these objects and their classification is known as a managed type. A particular instance of a managed type is known as a managed object. To get something done, users perform operations on these managed objects. These are the foundation of the DRA architecture description herein. Everything else is generally either derived or associated with managed types and operations.

Deputies perform the operations within DRA. A Marshal may be just a deputy with the power to create other deputies and whose managed Territory is all territories. The Marshal, for purposes of this description, has the power to define the actual DRA rules and DRA managed objects. For example, a marshal can create other deputies as well as grant them the power to perform operations. Conceptually, elements of the DRA rules are themselves managed types and the model allows delegation and policy enforcement over these types.

Territories (or active views) are group of managed objects to provide scope. Managed objects are included in territories via sectors (or rules). These sectors are dynamic rules that define the managed objects that make up a territory. For example, a sector might include all users that belong to the group Developers. As new members are added to the Developers group, these members will automatically become part of the territory. Another example is a sector made up to include all users that have 5 letters in their last name.

Territories may be used for filtering the enumeration of objects, delegation, policy and automation. Some examples of the use of territories are:

A Developers' territory consisting of all the members of the Developers group so that views in the GUI will only show people who are in the group Developers.

A territory defining a set of users over whom a deputy is delegated a power, like the right to reset their password.

A basic workflow that may be executed when a command is issued to DRA for embodiments of the present invention will now be described. Most operations from clients (users) go through a similar central logic:

License Check

Authentication

Data validation
    Operations can provide some basic validation of input parameters Authorization within DRA rules system if not authorized by DRA
    Check authorization outside DRA model—Check the native provider of the data to see if the user has the ability to do this operation (e.g., check the Windows NT SAM)

Condition check (Policy)

Begin Transaction
    Pre-operation automation procedures (Trigger)
    operation
    post-operation automation procedures (Trigger)

End Transaction

Logging.

Delegation allows a marshal to delegate the ability to perform operations on managed objects to deputies. In order to establish what operations deputies can perform, a marshal may create roles, like the helpdesk operator role. A role is essentially just a group of powers. A power is the ability to perform an operation.

Roles may be associated with deputies to give them the power to perform operations. As part of associating a power with a role, a marshal can set the power attributes. Power attributes may be used to control what a deputy can do within an operation. For example, the power attributes for the user update operation may specify which user properties can be updated, and, for example, could only allow the deputy to set the comment field during the user update.

Most of the time, power attributes may be a simple yes/no kind of property. Either you can do the operation or you can't. Power attributes may be used for operations that support multiple functions, like the previously mentioned UpdateUser.

Roles may be used to give a user the ability to create pre-defined sets of powers for quick association with deputies. For example, a user may wish to create a HelpDesk role that consists of the ability to reset passwords and set office phone numbers. As territories are created for each group serviced by a help desk, the marshal may select the pre-defined role instead of having to duplicate the steps necessary to empower a help desk person for each territory.

While roles and powers may grant a deputy the right to perform an operation, policy conditions may place restrictions on what a deputy can do during an operation. An example policy condition is one to restrict the setting of a home directory field of a user to refer only to one particular machine. Policy conditions can be attached at various places in the model. For example, policy conditions can be attached globally to an operation like updating a user so that the policy condition is enforced anytime a user is updated. A policy condition could, alternatively, be attached at the territory level so that the policy condition is only enforced when a deputy with delegated power in that territory performs an operation. Policy conditions could also be attached to deputy specifications and specific managed objects (identified by rules).

A policy condition generally simply passes or fails. Examples of policy condition are allowable values for an object property or a customer written (user defined) script.

Policy conditions may have a scope that is determined by a rule similar to a rule used to determine scope for a deputy or for a sector definition, although the policy condition may apply to all developers. When a deputy attempts any operation and is authorized, before the operation is actually executed, all applicable conditions may be tested. Policy conditions may be selected based on the operation being performed being within the scope of a policy condition definition.

Figure 13:
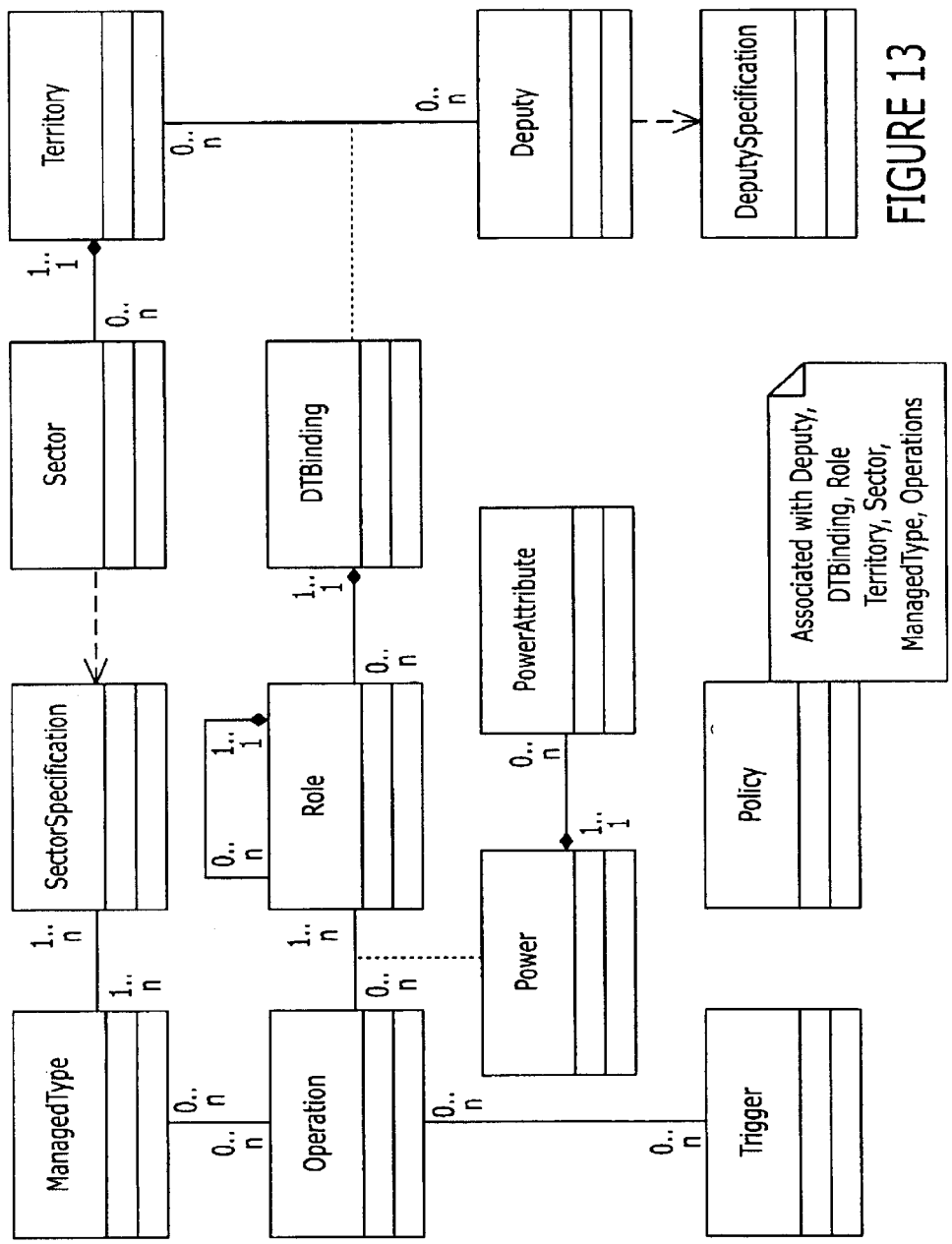
FIG. 13 is a schematic block diagram of a system for distributed administration according to embodiments of the present invention.

In addition to policy conditions to limit authority (power), automation may be provided through "triggers." Triggers are defined herein as including actions that can be executed either before or after a requested operation is actually executed. Users may define their own triggers as scripts and associate them with operations. A user might want to create triggers, for example, to add a new HR database record every time a new user is created. Triggers can also be predefined. FIG. 13 illustrates a conceptual overview of various of these aspects of the present invention.

Model objects will now be further described. Objects of many types may be managed. Each managed type may define its schema (containment, properties, etc.). Applications or modules that plug into DRA may consist of one or more managed types and the operations that work on those managed types to expand the base model with new functional modules for particular users. As an example, an account management module could contain group, and user managed types.

More managed types may continue to be added in this manner. In some cases, such as when managing Active Directory, this may happen dynamically as a user adds new object types to the Active Directory. In other cases, new functionality application modules, such as file administration, may be added to result in the support of new managed types. For example, a user may wish to define a new managed type Employee that combines the User object and their HR database. These managed types may be used to define sectors and deputies as well as work with operations in defining power attributes and policy.

Each managed type may be responsible for providing services to the overall DRA management application such as:
　Advertising schema information:
　　Can this type contain other managed types? Which types?
　　Properties (optional, mandatory)
　　Primary Interface Identifier (IID)
　　Class Identifier (CLSID)
　Client side facilities for
　　Rendering the object
　　Dialogs for displaying an object's properties
　　Defining sectors to add this managed type to territories
　Rules to identify instances of this type (a.k.a. sector definitions)
　Advertising operations possible on this type, including enumeration facilities.

In various embodiments a new managed type may be added without affecting the base model, architecture, or services. Knowledge of the characteristics of the managed type may be self-contained in the managed type itself and its supporting objects, rather than being spread throughout the system. As managed types are added to the base services, the managed types may combine to give greater flexibility and power than they do stand-alone, in that operations and roles combining multiple managed types can be formed.

In addition to the base properties which, in a Windows 2000 environment are those supported by the Active Directory (AD), DRA may support several methods for extending the property list for AD managed types. For Active Directory objects, a user may use standard ADSI extensions to add additional properties to user managed type. An extension mechanism called Virtual Property objects (VPOs) that the user can use to add properties to managed types is also provided in embodiments of the present invention as described previously.

Internally, mechanisms may be provided so that as new types are added to the Active Directory they are automatically made available as new managed types. A COM object may be provided to implement the managed type. For many types, a generic COM implementation will be sufficient.

A consolidated schema based on supported managed types may be provided. In addition, the server side of the DRA system may support the parsing of monikers, i.e. given a path to an object, the server will parse the path and return the object to the client side.

Operations are defined for this example as the objects that a user actually calls to perform some management task. Part of an operation is usually the target (managed type) object being acted upon. For example, when performing a UserUpdate operation, the client may pass the user object being acted upon as part of the operation. Operations primarily relate to managed types, though operations from multiple managed types can also be combined into new operations, and some operations may stand alone without association to any managed type. Most managed types will typically support operations for creating, deleting, updating and reading information about instances of an object of the type. Managed types may also publish a list of related operations.

Operations provide a mechanism for a user to interact with the DRA Server. Operations may be used to define powers and roles. The DRA server may provide for performing operations in a manner that couples authorization and policy enforcement with desired operations, as described in the basic workflow description above. Operations typically have a one-to-one mapping with powers; a power is defined for this example as an association between a single role and a single operation.

Operations may also provide the ability to assign power attributes to the binding of a power (operation) and a role, usually for an operation that supports multiple sub-operations. When defining roles, a marshal may define these power attributes. For example, a marshal may want to allow a deputy to perform user updates but only set the comment property. The marshal associates the update power for comment property with the operation (user update in this case) to form a power attribute. Operation objects may be responsible for defining these available attributes as well as aggregating them for user interface (UI) and authorization purposes. As used herein, a task is, basically, a power over a sub-operation.

The set of operations available in a DRA server according to embodiments of the present invention may be easily extended. Some new operations for some applications, such as Active Directory management, may be dynamically provided so that there are some standard operations that will be available for new object types in the Active Directory.

Users in various embodiments may extend this set of operations either by adding new operations to an existing managed type or by creating a new managed type and creating operations for managing this type. For example, if a user created a new Employee type, they may want to provide create, update and delete functions for establishing properties of this type. Because operations and power generally have a one-to-one mapping, new powers for this type may dynamically become available for assignment to roles for these new operations. Scripting of operations is also supported in various embodiments.

For descriptions herein, a notation will be used to indicate an operation for a given managed type. The notation <managed type>. <Operation>means an operation for the given managed type. For example, User.Update would reflect the Update operation for the User managed type. User.Update might be associated with a role to form a power in that role.

New operations may be defined in terms of existing operations. In the example above, the Update action on the new Employee type might internally call the User.Update function and the HRDatabase.Update function. Authorization may then be needed at the Employee.Update operation only, not on nested operations.

To perform an operation, the deputy may only need the power associated with the new operation. Having powers on any nested operations need not give the deputy power to perform the outer operation. Power over the outer operation need not give the ability to perform the nested operations separately.

Operation names may be kept consistent across managed types for purposes of clarity and consistency to help users. Among the common managed types are support, create, delete, update, read, start, stop, and pause. However, other managed types may be supported.

Roles (a type of administration power as discussed with reference to FIGS. 7–12) are defined herein as the object used to delegate the ability to perform operations to deputies. This may be done through associating roles through a binding of a deputy with a territory. Roles can contain multiple powers or other roles in their definition. Powers can be provided as effectively a yes/no condition on an operation. A marshal may place powers in a role. The power, in turn, is an operation tied with a condition. This is a subset of what a task is as described above. In other words, roles may consist of tasks which are a combination of powers and operations. Roles may be defined outside of the territory, and later associated with deputy-territory bindings. Default roles may be provided that are modifiable by customers. When a role changes, deputies associated with a role may automatically find their powers are changed dynamically.

The grouping of powers in a role provides benefit to users by allowing them to predefine these roles for common tasks performed in various territories. The users, for example, may want to have a common HelpDesk role that they will assign in every territory. This role may only be defined once and then associated with the appropriate deputy in each territory.

Roles may specify which specific properties from the extensible schema that an operation can act on. In other words, they allow a concept of a property-based power, which can be unified into a role to allow an operation on a set of properties.

Deputies are the users who perform operations within management system of DRA. Deputy objects define the "who" portion of the question "Who can do what to whom". A deputy by itself does not generally grant any ability to a user to let the user perform any operations. To get the ability to perform operations, a deputy object may be bound to a territory and this binding may be associated with a role. The territory then provides the set of objects the deputy can act on, and the role then defines the set of operations the deputy can perform on these objects.

Defining deputies outside territories may provide several advantages. First of all, the same deputy object can be associated with several territories and as the deputy object is modified the change automatically takes effect in all territories. Placing the deputy outside a territory also allows marshals to be redefined as just a special case of deputies. Marshals may then be understood as just deputies who have the authority to manage DRA configuration objects, such as territories.

Architecturally, sectors and deputy objects may be almost identical. Typically, however, while sectors will be able to span any type of managed objects, deputies will only be defined through user objects or containers of user objects. Thus, deputy specifications are essentially instances of sectors matching user managed objects. As more types of user sectors are defined, such as a property of the user object having a certain value, these capabilities may be propagated to be possible deputy specifications.

Territories are defined herein as groupings of managed objects which support adding scope to rules. The actual set of managed objects described by a territory rule may be dynamic. For example, if a territory is defined as everyone in a particular group when a new member is added to the group, that member may automatically become part of the territory.

Containment of a managed object in a territory may be non-hierarchical. The same object can reside in several territories which facilitates establishing rules.

Sector objects as used herein define which managed objects (scope) a territory contains. A territory contains a list of sector object/attribute pairs. The attributes in this list specify attributes of the sector within this territory, such as whether the sector is an exclude or include sector.

For container objects, the marshal may be provided the ability to specify whether the sector matches just the container object or whether it also matches the objects in the container. For example, a marshal may want to add a group sector to a territory, which specifies only that the group itself is in the territory, and does not imply that all users in the group are in the territory. The marshal may want to specify that only users with names starting with the letter X in a particular OU are members of a territory. It is the responsibility of the sector object to determine whether or not a managed object falls within its scope. Sectors may specify territories.

To grant a deputy the ability to perform operations on some managed objects, a deputy object may be bound to a territory. Roles may be attached to this binding to grant the deputy the ability to perform the operations allowed by the role over the objects within the territory. One or more roles can be associated with a single deputy-territory binding; deputy-territory bindings with no roles are preferably not allowed. The territory provides the scope of objects upon which the deputy can perform the operations.

Policy conditions as used herein place restrictions on the operations performed by a deputy. An example is that a deputy may only be allowed to set user's building number to 10 or 15. A policy condition may be understood as simply an object that returns success or failure so that DRA can decide if conditions are met to allow an operation to continue. Policy conditions may be provided, for example, as a set of acceptable values for a property of a managed object or a script. In various embodiments of DRA, all conditions applying to a particular operation must pass before the operation is allowed. However, other rules may be applied.

Policy conditions may have scope. When a deputy attempts to perform an operation, it is determined which conditions are applicable. For example, a policy condition could be set to only allow Developers' user accounts to be created between the hours of 10 and 11 in the morning. This policy condition would be checked when the user update operation is called and the target of the update operation is a developer.

To define the scope of a policy condition, a marshal may define a policy territory. A policy territory defines the scope to apply to policy conditions and the set of policy conditions to apply to that scope. This scope may be defined in terms of managed objects, operations and deputies. This definable scope may provide marshals flexibility in how they apply policy conditions. For example, a policy condition could be applied to any operation done by anybody on any object, or alternatively, a policy condition could be applied to only a updates of the comment field of the user "Von" by the deputy "Gene."

The concept of a policy territory does not preclude exposing policy conditions as if they were associated with the objects in the application model. For example, an "Add Condition" operation could be added on a territory that makes it look to the user as if they were adding a policy to a territory when, in fact, they were actually creating a new policy territory linked to the existing territory.

Policy conditions may be applied to affect the results of an operation that a user attempts. Alternatively, the UI may be changed dynamically based on conditions. For example, in the first case, even though policy conditions exist that only allow a deputy to choose from building numbers 10 or 15, the UI will not present a list from which the deputy could choose. However, if a condition fails, an error message may be presented to the deputy which contains a description of the failed condition so that the deputy can know what went wrong.

Super users may also be defined who may override a policy condition. This can be done, for example, through the use of exclude sectors while defining the scope of a policy. For example, to apply a policy condition to everyone but users in the SuperUsers group, an exclude deputy rule can be added to the policy territory for the SuperUsers group.

While policy conditions are primarily described above as used for validating operations, an auditing tool may also be created that checks existing objects against policy conditions to see if they match. This would be similar to Microsoft's Security Configuration Tool. Such a Policy Auditing tool could be run in a batch style.

Triggers as described herein can be attached globally to a managed type or operation or can be associated with a territory. When associated with a territory, the trigger may only be executed if the territory authorizes the deputy performing the operation. Triggers may not only allow automations like home share maintenance, but also may be used to extended feature sets, such as the ability to propagate Active Directory (AD) changes to other, third-party directories, allowing AD to be the master directory in an enterprise.

Data about the operation may be passed by DRA to the trigger. For example, a user create operation may pass the new user object to the user create trigger. The data which is provided may include the authenticated user making the request, the operation or set of operations which are being performed, the object being acted upon, the new values, etc.

Triggers are generally part of the operation transaction. Therefore they may support some commit/rollback or test/perform mechanism that allows them to deal correctly with transactions that succeed or fail. Triggers may do Test and Do methods to allow them to take part in the transaction. This method may not require maintenance of state for undo purposes which might otherwise be necessary if a trigger script is called and later needs to roll back due to a failure of some component of the transaction.

Both synchronous and asynchronous triggers may be provided. Logic for synchronous triggers may handle the case of a defective trigger that fails to return for a long period of time, for example, via a timeout mechanism that causes the trigger to fail after some period of time. The trigger may be able to override this timeout value or set whether the trigger should be thought to pass or fail if the trigger needs to be aborted because of the timeout. For example, in a trigger script, the default timeout could be modified in much the same way as a database access timeout may be modified in ActiveX Data Objects (ADO).

One type of a trigger is a command line launch. The command line may include replacement parameters for the managed object name, etc. These may be used to replace parameters like %name% rather than having a hardcoded command line format. Another type of trigger is a customer-defined script. Dynamic User Interfaces (UIs) are also provided in various embodiments. For example, each operation that supports multiple properties may let the Marshall define what fields/defaults that the deputy will use. A UI follows may be used such as illustrated in FIG. 14.

Figure 16:
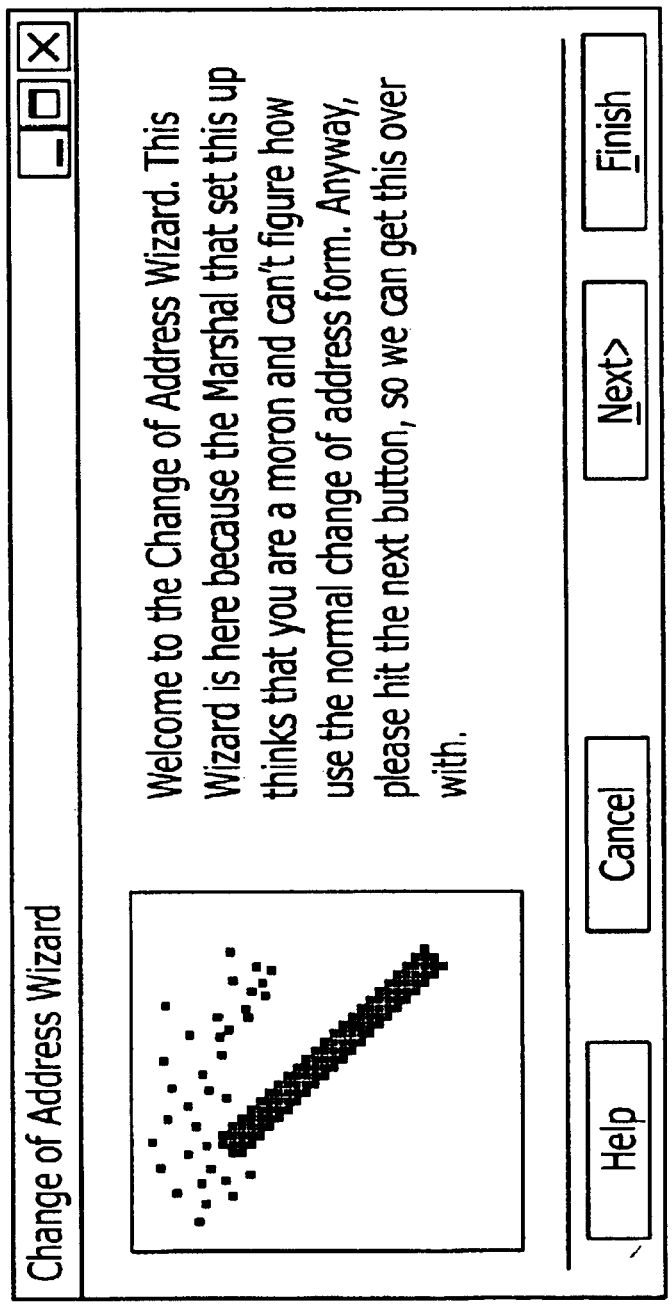
FIG. 16 is a schematic diagram of another user interface screen according to embodiments of the present invention.

This may, for example, allow the receptionist to change the address and last name (for those people who get married) but not see the SSN or AIDS test results. A marshal may then specify what sort of entry screen they want the deputy to see, such as illustrated in FIG. 15. Alternatively, a Wizard type UI approach may be used as illustrated in FIG. 16. An operation architecture for embodiments of the present invention will now be descried with reference to an example. First, a base operation interface, will be defined and subsequently refined. This will be done with the use of a working example, UserUpdate. Operations generally have two basic tasks. One is to configure (by a marshal) the operation for use by the deputy. Second, it is used by the deputy. Thus, we have:

Operation

Define( )—used by the marshal to define the operation for the deputy to use.

Run( )—used by the deputy to run the operation.

This base operation allows the marshal to define something and the deputy to use this something to run the operation. Thus:

Operation

Powers Define(void)

Void Run(Powers)

It may also be desirable to allow the deputy to be able to deputize some properties. The Define method may, therefore, have execution context. An exemplary server side data storage as follows may help to visualize the situation:

```
HKLM
    MCS
EA5
    Marshal
        UserUpdate
            Run       AllPowers
            Define    AllPowers
        DeputyJoeWithDeputize
            UserUpdate
                Run       SomePowers
                Define    SomePowers
        DeputyJane
            UserUpdate
                Run       SomePowers
```

As support is provided for the deputize feature, support may also be provided for powers be supplied to the define method, which provides:
Operation
    Powers Define(Powers)
    Void Run(Powers)

The Define method as described is responsible for defining the powers that will be delegated to the deputy. The powers may be reflected in the Powers return value. These powers will be used as a context for the deputy to execute the same operations later, hence the Run method.

As described above, powers are specific to operations, not operations being defined by powers. Such powers are generally only useful to the operation that defined them. Thus, such powers have no substantial meaning outside the scope of the operation that defined them. Operations and powers are thus connected.

A facility may also be provided for supporting "tasks." For example, a marshal may want to create something that the helpdesk personal could use called "Reset Password." Resetting passwords is typically a function of the updateuser operation, but the helpdesk people may not know that and the marshal may not want to have to worry about all of the other aspects in updateuser. Basically, the marshal wants to allow for the helpdesk to perform just the reset password function (similar to a sub-operation).

Given that the deputy is allowed to set up the powers associated with the operation that he or she wants to allow, these powers may, in turn, be associated with a name. For example, the marshal defines updateuser powers to just allow resetting the password, then assigns a name ("Reset password") to the powers returned from the Define. Later when building the rule helpdesk, the marshal may add this "Reset password" task, thus allowing anyone with the helpdesk role the ability to perform the updateuser operation with the "Reset password" powers.

Figure 17:
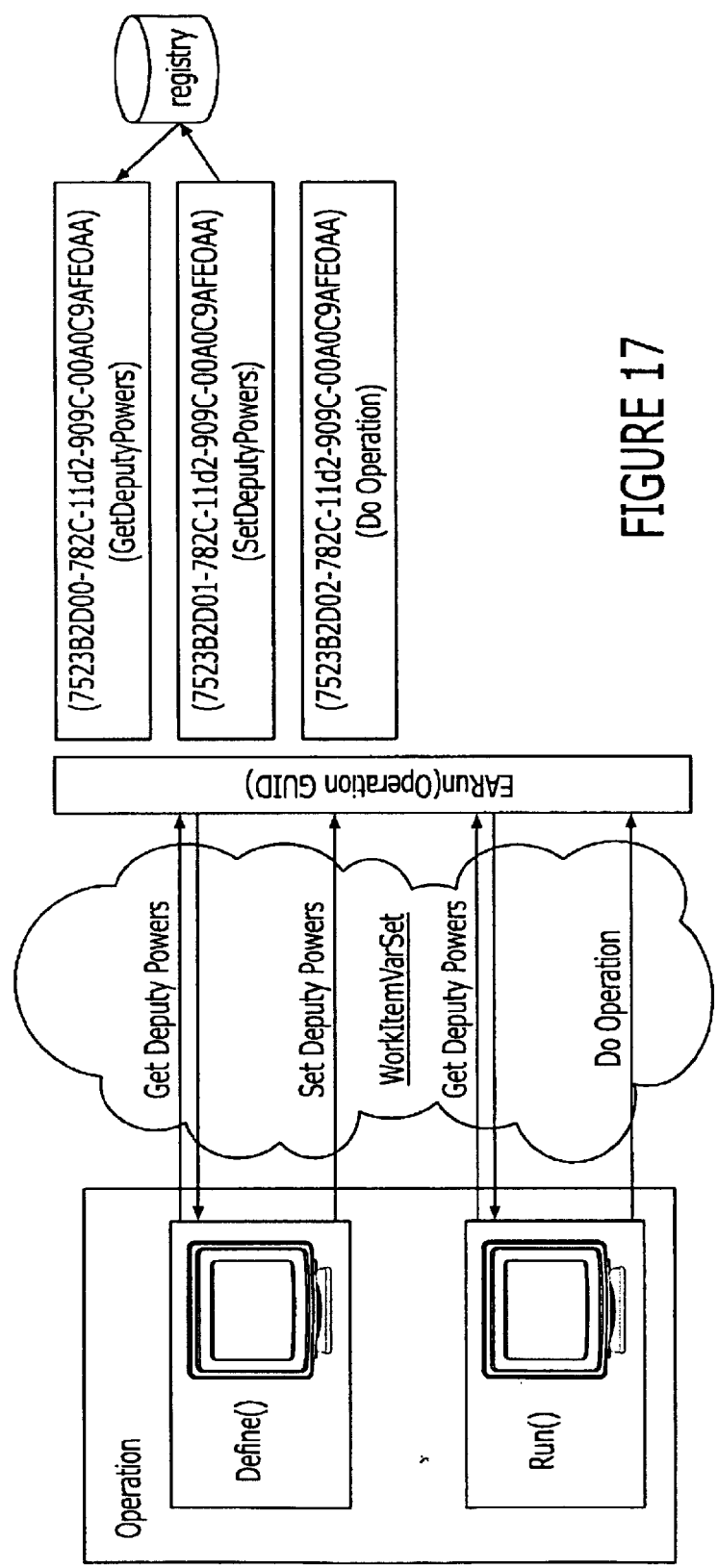
FIG. 17 is a schematic block diagram illustrating establishing delegated powers according to embodiments of the present invention.

An exemplary client-server side architecture for such operations is shown in FIG. 17. As shown in FIG. 17, an operation is defined on the client, then shipped through a WorkItem VarSet to a single entry point on the server to interpret the varset and call the correct operation. As is also shown in FIG. 17, there are two modules, one for the client side and one for the server side. The registry is also shown in FIG. 17 which is used to support the operations.

Thus, operations may be built to run on the server side. Generally, workitems are submitted from the "client" to a central entry point on a server, which in turn pulls out a Globally Unique Identifier (GUID), CoCreates the object, creates two more empty workitems and passes all three workitems to the object. The first of the workitems may contain the information submit by the client, the second may be used for any return information to be sent back to the "Client" and the last (third) workitem may be used for internal flow state and variables.

Operations under distributed administration may include seven basic steps in various embodiments including: 1. Authentication; 2. Authorization; 3. Policy enforcement; 4. Pre-task Trigger; 5. Core operation; 6. Post-task Trigger; and 7. Logging.

In this model, the core operation is the one that actually does the requested work, such as CreateUser or DeletePrintJob. This core operation that actually does the work, may, for example, call the OS and the Cache to get the job done. To avoid confusion herein, the group of steps will be referred to as an operation and the "Core" operation will be referred to as a primitive.

Note that, in COM based embodiments, the operations and primitives may have the same COM interface. By way of example:

DO(pWorkItemVarSetInput, pWorkItemVarSetReturn=NULL, pWorkItemVarSetInternal=NULL)

Note that, for this example, the $2^{nd}$ and $3^{rd}$ parameters are not used in the operation call, but are used in the primitive call. From an Iworknode the process method may appear as:

Disposition Process(IWorkItemVarSet *pItem, IUnknown **ppResponse)

Note that two or more Workitemvarsets may be supported. As the workitemvarset is generally a recursive structure, 3 workitemvarsets may be inserted under a single parent WorkItemVarSet. For example:

WorkItemVarSet (just a place holder)

WorkItemVarSet*pInput
WorkItemVarSet*pOutput
WorkItemVarSet*internal

Thus, this described architecture is similar to an Internet implementation of a 3-tier architecture as in Client (Browser)/Presentation Services/Business Services/Data Services. It may thus be used in the framework of Distributed INternet Application (DNA) as will now be further described. Note that operations as described above took a varset as a parameter, ran server side as a workflow and used provided each node of the workflow as a primitive.

In the object oriented world there is something called objects. Objects are "a group of related data and functions." Thus, a group of operations that were related to each other would be similar to an object. Moreover, an object is generally more than just a set of functions, it has a physical representation (in memory at least). Therefore, groupings of operations will be referred to as types. For example, CreateUser and Delete User could be said to be in the type User. Note that Managed Types were discussed earlier. Thus, CreateUser becomes User.Create and Delete User becomes User.Delete. In other words, grouping of operations may be presented to users as managed types.

Also, objects were previously described as a group of related data and functions. Functions have now been described. Data may be an object used to maintain context or state, which is a construct in (OOP/OOD). Context is useful in making programming easier, but Context and Object Pooling generally do not mix. Object pooling may be provided for us as a part of DNA.

As specified by Microsoft Corp. for a truly scalable system, all server side objects must not maintain state or Context. This may make it more difficult to build applications as building a context-less system may require passing all context-related information on nearly every call. However, referring to an example of contents in the address bar of a browser after you have navigated around a web site a while:

> http://www.dejanews.com/dnquery.xp?QRY=life+secerts&DBS=
> 2&maxhits=25&f ormat=terse&showsort=score&ST=
> QS&LNG=ALL An approach to this problem is illustrated. The example is of a dejanews search on the secrets of life. The browser is submitting all information required to setup context to the server. The present invention, in various embodiments, uses a server side deployed model following the Microsoft DNA initiative. However, in contrast with the Internet, plain text is limited due to security and the sheer volume of data in distributed administration. Thus, the VarSet may be used instead to support variant types including IUnknown, in a persistent manner which may be encrypted. VarSet may be used for all Inter-Object communication, essentially, as a big scratchpad. It can store information, have information pulled from it, dump information to a log (for field debugging), persist information somewhere (it supports IPersistStream), etc.

The example described thus far may be summarized as follows:

We have a VarSet, which may be used to maintain Context among other uses.

An operation may be described as a workflow made up of primitives.
1. Primitives are the lowest level.
2. The workflow may be dynamic so you can change the primitives and make new operations.

Operations may be grouped together to make a Managed type.

A Managed Type is, essentially, a grouping construct.

Thus, given the supporting objects (non-operation objects) like the VarSet and Workflow engine, primitives may be provided and put together into operations. A typical operation may be broken up into two other operations. For example, to extend the system with a new User.Delete operation, you would need to build the main operation "Delete User" and a supporting operation, GetDelete UserUI.

Figure 18:
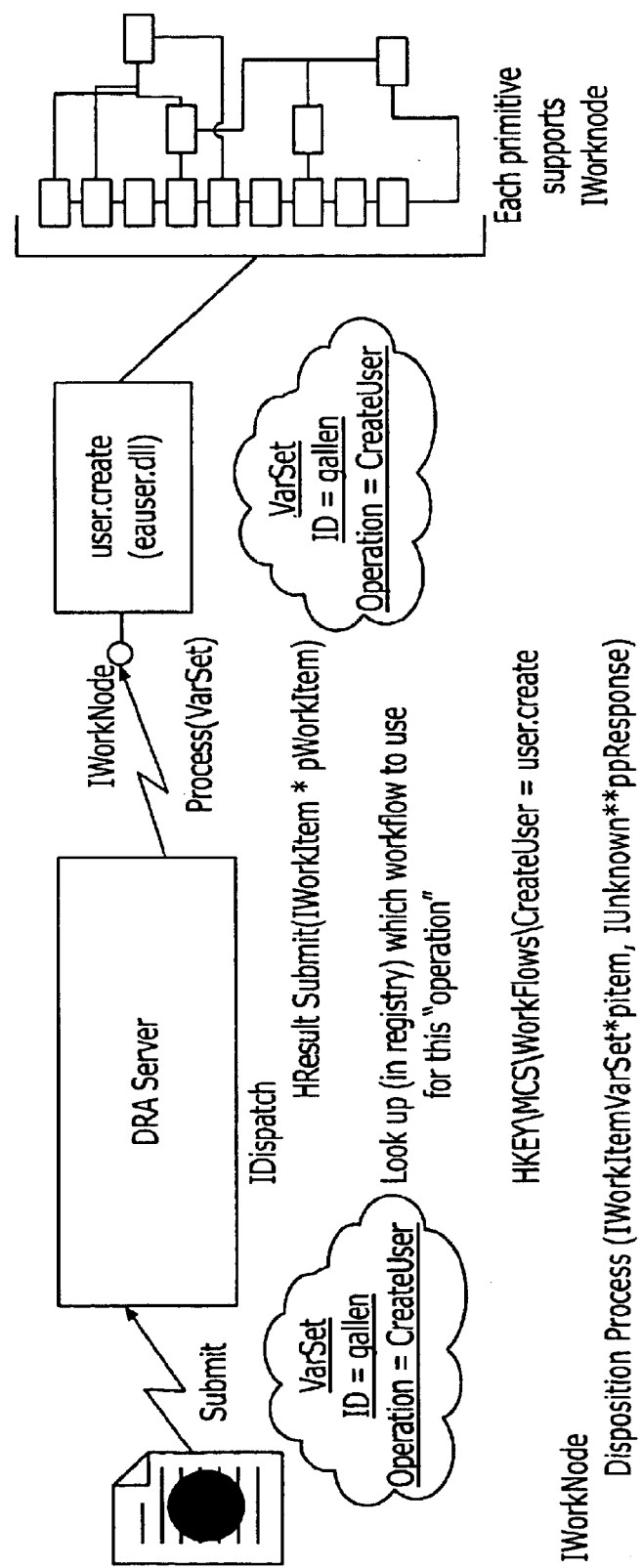
FIG. 18 is a schematic block diagram illustrating processing of a request for execution of a delegated power according to embodiments of the present invention.

This is illustrated in FIG. 18, in an architecture where selection and submission are done on the client and other work is done on the server. As shown in FIG. 18, Client Applications (GUI) may build a VarSet and Submit the request directly to the DRA Server via DCOM. Other approaches, such as EAC32.dll or CORBA may also be used with the present invention.

The architecture illustrated in FIG. 18 may be compared to an Internet model. For example, typing a URL could be analogized to submitting an operation called "GetDefaultScreen", which would contain HTML text that would allow you to continue to navigate through the rest of the administration management application via other operation requests to the DRA server. This allows for use of a dynamic HTML (DHTML) and MMC interfaces. Further implementation examples for this architecture will now be described.

As a preliminary, a "module" will be described for purposes of these examples. The consumers of the module are operations and worknodes. Operations are the exposed calls available to client programs. Worknodes are the individual steps in the workflow of an operation. Operations are written for the new module in order to be exposed to the outside world which consist mainly of data outside the module DLL (and could be considered to be outside the module itself).

A module exposes itself to the world through primitives (discussed earlier). These primitives are the interfaces the outside world uses to talk to the module. Behind these primitives is a set of services. The services provided by a module for this example are:

| | |
|---|---|
| Schema | Managed type information |
| Cache | In memory data for fast access |
| Enumeration and Filtering | Enumeration of objects in cache |
| License Check | Is this module covered by license? |
| Authorization | Interfaces for defining and using sectors/deputies |
| Authenticate | only provided by account module |
| VPO Support | Virtual property objects |

Primitives are the methods Worknodes use for interacting with a module. These methods are provided via interfaces provided by the module. For example, the schema service for a module provides the IEaSchema interface. All the details of a module are hidden behind these primitives. People building worknodes for operations call the module's primitives to perform low-level operations or gather data about managed types or individual objects. For example, a user of the UserCreate primitive just knows that he is creating a user. The module may be updating the cache and adding a new entry to the Active Directory as well as calling any methods for virtual properties (VPOs) to be created for the new user.

The code in a module preferably does as little with policy and cross-module interaction as possible. For example, when a user is deleted and there is a matching sector, the sector is deleted as well. This code may be handled in the UserDelete worknode not by the user delete primitive.

Here is an example: to build a UserGetInfo worknode, the worknode author would call the following primitives:

GetObject(username): return an object of the type user for the specific requested instance Put( ) for property to be set SetInfo: Actually update the object in the OS and cache The schemas provided by each module may provide information about the managed types that are available to be managed by virtue of the module. The schema piece for each module may support the IEaSchema interface. This interface provides the methods for obtaining the system-wide generic schema information used throughout the DRA product.

Each module may provide some other interface for getting more module-specific schema information. For example, the accounts module could provide an interface for getting to the Active Directory schema information.

Preferably, the schema information will be available from instances of objects in the cache so that objects in the cache can be directly queried for this information. The schema need not contain sufficient information for the ADSI provider schema code. The information in the DRA schema is for internal use only although it may be published by the DRA ADSI provider. Information about the underlying schemas of directories managed by DRA, such as the Active Directory, may be presented through some primitives on the associated module. The schema should keep track of changes in the schema which cause properties to be created and deleted so that users of the schema can get this information. For example, if we delete property 10 and add property 28, hole 10 may be advertised as no longer used. All new properties may be added at the end. IDs for properties may be handled by a mapping mechanism. The IDs for managed types and properties may be supplied by the schema service. These are preferably persistent and not reused. Thus, if someone deletes property 7 then ID 7 will not be reused.

In COM embodiments, interfaces may be provided such as the following example:

| IEaSchema | |
|---|---|
| get_ManagedTypeList | |
| IEaManagedTypeList | |
| GetCount | returns number of managed types |
| Reset | set next type back to first type |
| Next | return next type |
| IEaManagedType | |
| get_name | display name of this type |
| get_id | internal ID for this type |
| IsContainer | this type is a container |
| IsGroup | this type is a group |
| CanBeUsedAsSector | this type can be used as a sector definition |
| CanBeUsedAsDeputy | this type can be used as a deputy definition |
| Is Cached | whether objects of this type are cached |
| get_PropertyList | list of properties that make up managed type (IEaPropertyList) |
| get_SuperiorList | list of possible managed types that can contain this type (IEaManagedTypeList) |
| get_SubordinateList | list of type this type can contain (IEaManagedTypeList) |
| IEaPropertyList | |
| GetCount | returns number of managed types |
| Reset | set next type back to first type |
| Next | return next type |
| IEaProperty | |
| get_name | name of property |
| get_id | internal ID for this property |
| get_syntax | syntax of property |
| get_maxrange | max range for property |
| get_minrange | min range for property |
| get_multivalued | is this property multi-valued |
| get_Vpo | Is this property a VPO |
| get_VpoGuid | GUID for COM object for VPO |

A cache may be used to provide fast access to the managed objects and their properties as needed for authentication, authorization and common enumerations. It may handle locking issues around its data and deal with maintaining the state of its data.

The cache may be used for the data desiring fast access. This need not be a write-through cache. The layer that wraps the cache and provides primitives for the operations may provide the write-through aspects of the cache.

The cache may provide in-memory copies of managed data to satisfy users who need very efficient access to data. The cache may consist of some of the managed types for a module and only some of the properties for the included managed types. Examples of needs for fast retrieval are: Common enumerations (filling UI list boxes); Authorization (see IEaAuthorize); and Authentication (Acct Module only).

Exemplary interfaces used to control the contents of the cache and the scheduled refresh of cache data are as follows:

| IEaCacheConfiguration | |
|---|---|
| get_CacheGranularity | list of objects that can be scheduled for auto-refresh (e,g, domains) |
| get_CacheState (cacheobject) | State of cache information for a piece of cache e.g. Last refresh detail; Scheduled cache times |
| set_RefreshTime (cacheObject) | Configure the cache parameters-Refresh times |
| IEaCacheRefresh | |
| RefreshObject (objectpath) | refresh individual object in cache (e.g. a user) |
| RefreshObjectRecursive (objectpath) | refresh cache starting at some point in tree (e.g. some OU) |
| Refresh Cache(scope) | manual refresh of some cache pieces normally scheduled |
| IEaCacheLock | |
| | Locks a part of the cache |
| | Supports read/write locks |
| | Single writer/multi-reader model |
| | Only holder of write lock can continue to do operations |

Should this be done at the object level and let the cache decide how much to lock?

In most cases, UIs will use the IEaEnumeration interfaces to quickly walk through objects in the cache although an approach using non-COM walking may also be used.

Various further interfaces are as follows:

a) Cache Object

Generic interface provided by all objects in cache. This is parallel to the IADs interfaces used by ADSI. Once you have an object you can query for the type specific interface such as IeaUser.

Here is the table from the IADs interface:

| ICacheObject Methods | Description |
|---|---|
| get_Name | Gets the object's relative name. |
| get_Class | Gets the object's schema class name. |
| get_GUID | Gets the object's globally unique identifier. |
| get_ADsPath | Gets the object's ADsPath that uniquely identifies this object from all others. |
| get_Parent | Gets the object's ADsPath string for its parent container. |
| get_Schema | Gets the ADsPath string to the schema class definition object for this object. |
| GetInfo | Reloads the property values for this object as they exist in the underlying directory service. |
| SetInfo | Saves the changes on this object and its dependents. |
| Get | Gets the value for a property by name. |
| Put | Sets the value for a property by name. |
| GetEx | Gets the value for a single or multi-valued property by name. |
| PutEx | Sets the value for a single or multi-valued property by name. |
| GetInfoEx | Reloads specific property values for this object as they exist in the underlying directory service. | b) Cache Container

Container interfaces similar to IADsContainer.

| ICacheContainer Methods | Description |
|---|---|
| get_Count | Gets the number of objects in container. |
| get_NewEnum | Get interface on an enumerator object. |

| ICacheContainer Methods | Description |
| --- | --- |
| Get/put_Filter | Gets/sets the filter on the schema classes to use for an enumeration. |
| Get/put_Hints | Gets/sets properties to load. |
| GetObject | Gets interface on a named object. |
| Create | Requests creation of specified object.. |
| Delete | Deletes a specified object. |
| CopyHere | Copies a specified object within a directory service. |
| MoveHere | Moves a specified object within a directory service. | c) CacheGroup

| IcacheGroup Properties and Methods | Description |
| --- | --- |
| get_put_Description | Description of the group membership. |
| Members | Gets an ICacheMembers interface on the members object that is the collection of ADSI objects that represent the members of this group. |
| IsMember | Tests for membership. |
| Add | Adds an object to a group. |
| Remove | |

Enumeration may also be used in embodiments of the present invention. Enumeration may provide the ability to get a list of items matching a given filter and of a given type. For example, user, group and account enumeration APIs may be provided, each of which may have their own set of supported filters. Enum APIs may fill a buffer starting at some index with the requested data for objects that match the filters. A field mask may indicate which properties the caller of the enumerator is interested in. The caller of the enum APIs may then be responsible for providing the buffer for storage of the enumerated items. An exemplary interface is as follows:

IEnum
FillBuffer
set_Start(name or index)
set_Buffer

One worknode which may be provided is for checking the current license against the required license for the operation. This may be implemented in a worknode for this module not in its primitives. For example, a worknode ILicense is as follows:

Module Licensed(current License Object): takes the license currently installed and returns a status for the module such as licensed, not licensed, in grace period etc.

A further module supports specific work for the general authorization routines. For example, IeaAuthorize may be described as follows:

Matches(sector, object)—does an object match the sector definition

Type Supported(managed type or object)—which may work with IAuthorize or with IEaSchema.

A further module can optionally provide an interface for identifying clients. This service may be provided by a module that deals with user accounts. This may allow configuration outside the modules to use whatever module that deals with user accounts interchangeably for the purposes of authentication and authorization. For example, while a Windows NT SAM module may be used for authentication, it may be desirable to use the NDS module as the provider of user information. An exemplary module, IAuthenticate may be described as follows:

Get User From SID( ): populates working varset with client information:

Virtual Property Objects (VPOs) were generally introduced above. VPOs allow users to extend the property list of a managed type with a virtual property. A virtual property may be implemented, for example, through COM objects that expose an interface for getting and setting the value of a virtual property. This allows a value to be associated with an object that is not stored in the same manner as other properties of the object to appear as if it was just another property. For example, a VPO could be provided to make the disk quota on a server for a user appear to be a property stored in the Active Directory, when in reality it is stored in the registry of some server. VPO support may not be exposed to the worknodes. It may be used internally by the schema and cache services of a module. Writers of worknodes need not aware of the difference between VPOs and actual properties. For example, you could Define Register a COM object as a VPO for some managed type. A well-known interface could be used to describe property information for loading into schema and to get and set property for an object. Objects being acted upon may be passed to VPO through an LDAP Path for directory objects and, alternatively, through ADSI extensions.

One particular aspect utilized in the DRA embodiments of the present invention as described above is the use of dynamic workflows. The EA product, described above in the background, was bound to APIs for its operations which typically required that many steps were repeated in every call and the associated APIs were often difficult to extend when needed. In contrast, in various embodiments of the present invention as described above, workflow engines are based on COM in which a workflow engine COM object is used to drive a state machine of a workflow. Thus, the COM objects represent both the workflow and a worknodes within the workflow which. This model may facilitate ready extendibility as needed.

The workflow defines the path through the worknodes and calls each applicable worknode and, based on the result of the worknode (for example fail or pass), the workflow decides where the next worknode is. Each called worknode does some work and returns a result to the workflow. Thus, the worknodes may be essentially independent and shared by a variety of operations implemented in different workflows.

The model using such workflows and worknodes is run time (as contrasted with compile time) dynamic as either the workflow or worknodes can be changed, replaced or updated at run time without affecting other code in the system. For example, if a performance monitoring node was to be added to each operation, the associated workflow COM objects for the operations could be updated and a performance monitoring worknode COM object (or objects) could be added with the desired measurements which would then be implemented in the workflows when invoked at run time. Note that the workflow model may also be recursive as a worknode may itself be considered as a workflow. The registry may be utilized to allow the workflow to be drawn (populated with worknodes) from the registry at run time.

Such a workflow approach may be highly customizable. The workflow COM object may be used to drive the state machine of a workflow with the workflow/worknodes responsible for defining state transitions (which may be as simple as using only pass or fail criteria). Each worknode would then be responsible just for returning something in the varset that continues to building the varset (like XML) to pass state transition information back to a workflow.

Workflow engines in accordance with various embodiments of the present invention also provide for addressing situations of missing worknodes or worknodes that fail to return transition information. In particular embodiments, the registry is used to store the COM information about workflow engines and worknodes.

An example of a workflow engine is illustrated in FIG. 9 and also in FIG. 11B where the various boxes of the flowchart provide the worknodes and the overall flowchart defines the workflow. In the context of FIG. 9, for example, a user could submit a request to the DRA server with the varset containing an entry called Operation Name. The DRA server would then look up the operation to find the workflow engine to run. The workflow engine COM object is created at run time to execute the associated method for the operation requested by the user. More parameters of the varset may be obtained from the user through a graphic user interface (GUI) provided through a web console or a MMC interface.

As the created workflow engine COM object calls various worknodes, the respective worknodes look at the varset to get the data for the worknode and further may add additional data to the varset. Thus, each worknode may be responsible for returning state transition information back to the workflow engine. However, like XML, a varset may be understood as just a collection of data that each consumer only looks to for the pieces of information in which it is interested. The workflow, therefore, may only look at the transition information in the varset. For example, in a typical workflow as utilized in support of the DRA server described above, the policy worknode 945 would generally be executed. The overall workflow need not care that the called worknode is a policy worknode. It merely needs to create the worknode COM object associated with policy and tell it to execute. The policy object then looks at the varset for information, such as what is being done and by whom, and sets off to see if the operation associated with the workflow passes the policies of the policy worknode. Within the policy object worknode, policy scopes (i.e., what requests the policy applies to) may be tested to see what policy objects apply and then the appropriate policy objects can be called to see whether they are satisfied.

Because this described workflow/worknode methodology centers around pluggable engines and worknodes, it may be very versatile. For example, a workflow engine could define alternative transition states, other than pass or fail, for transition between worknodes. It could further utilize a variety of conditions, such as counting the number of connected users, and connect to different worknodes depending upon whether the number of users was, less than 10, less than 100 or greater than 100 and so on. This could be done by defining transition information, such as return a number 1–3 and call the appropriate worknode responsive to this return number. This would provide an alternative to a pass/fail return.

In a further aspect of the versatility of this model, a workflow can actually load another workflow as part of a worknode in a recursive manner. Workflows could also initiate asynchronous operations and continue on with the workflow while such asynchronous operations execute. These different capabilities are merely a function of the design of a particular workflow engine. Using the COM approach as described herein, such versatility could be provided by simply registering the COM object for a new worknode engine, loading the workflow engine name in the registry for operations to which it applies and registering the worknodes for the nodes of the state machine implemented by the workflow engine. Thus, the workflow engine may be built at run time using the registry information.

For the embodiments of a workflow illustrated, for example, in FIG. 9, for each state in the workflow (i.e., each box in the flowchart), the workflow engine runs a worknode COM object. What COM object to use is specified in the registry for the workflow. An operation can specify a worknode object for any object in the workflow. If the operation requested by the user does not specify the object, the workflow generation engine looks to the parent workflow of the operation to determine the worknode object. In turn, each worknode object for the illustrated embodiments is responsible for setting the varset variable Work.Continue to either "pass" or "fail." For example:

pPtr->put ("Work.Continue", "Pass");

If a workflow engine fails to find a worknode object entry at any level, it may, alternatively, assume that the worknode passed or failed. If the workflow engine finds an entry for the object at all (for example, a registry key having the right name exists), there are several possible scenarios and how they are dealt with in particular embodiments is as follows: If a valid COM object is found in the registry, the worknode is responsible for putting pass or fail in Work.Continue. If the workflow engine does not find Workflow.Continue in the varset after calling the worknode, the workflow engine assumes a failure. Note that the workflow engine may clear the Work.Continue value before calling each worknode to place it in a state to be set by the called worknode. If a worknode fails to set this value to pass or fail, the workflow engine may log an error and, if desired, treat this as a pass situation to continue workflow operations, such as to successive worknode boxes in the flowchart illustration of FIG. 9.

While the above description applies where a worknode registry entry state is found, whether there is no registry key for the worknode step, a pass (or fail) state may be assumed. Similarly, where no entry for the value "primitive" is found, a pass (or fail) state may be assumed. If an entry for the value "primitive" results in a return of "cannot create COM objects," such as would occur for a blank or bad COM object name, various embodiments of the present invention assume a fail state in the corresponding worknode. Thus, a highly customizable workflow/worknode model may be provided allowing for run time, rather than compiled, changes to underlying worknodes called by a workflow with the workflow engines being created at run time responsive to a request from a user being received by the DRA server application.

While the workflow/worknode aspects of the present invention have been described above in the context of methods and systems for distributed administration in accordance with embodiments of the present invention, it is to be understood that this run time flexible model may further be utilized for other types of applications where it is desirable to provide for changes in operations of nodes of a workflow seamlessly at run time. The use of the varset passed between the called worknodes and the workflow engine for an operation further provides the option of maintaining all state related information required for the operation in the varset so that neither the workflow engine or the worknodes themselves need maintain state information other than that defined by the passed varset. Finally, as noted above, while the workflow/worknode model operates as a synchronous workflow, it may be integrated with asynchronous operations initiated by the workflow engine.

It will be understood that the block diagram and circuit diagram illustrations of FIGS. 2–18 and combinations of blocks in the block and circuit diagrams may be implemented using discrete and integrated electronic circuits. It will also be appreciated that blocks of the block diagram and circuit illustration of FIGS. 2–18 and combinations of blocks in the block and circuit diagrams may be implemented using components other than those illustrated in FIGS. 2–18, and that, in general, various blocks of the block and circuit diagrams and combinations of blocks in the block and circuit diagrams, may be implemented in special purpose hardware such as discrete analog and/or digital circuitry, combinations of integrated circuits or one or more application specific integrated circuits (ASICs).

Accordingly, blocks of the circuit and block diagrams of FIGS. 2–18 support electronic circuits and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some alternative implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method for distributed administration of a network environment having defined administrator authorities, the method comprising:

defining a plurality of entity objects associated with the network environment, the entity objects having an identifier and properties, the entity objects not having the administrator authorities of the network environment, defining a plurality of administration powers for the network environment, the administration powers establishing the properties of selected ones of the plurality of entity objects using the administrator authorities of the network environment;

defining a plurality of rules specifying ones of the plurality of entity objects authorized to invoke ones of the plurality of administration powers to establish properties of target ones of the entity objects based on at least one of the properties of the target ones of the entity object;

receiving a request to establish one of the properties of a target one of the entity objects from a requesting one of the entity objects; and wherein the following are executed by an administrator application executing on the network environment responsive to the received request:

identifying one of the plurality of rules associated with one of the plurality of administration powers for the one of the properties;

obtaining the at least one of the properties of the target one of the entity objects designated by the identified rule;

executing the identified one of the plurality of rules to determine if the requesting one of the entity objects is authorized to invoke the associated one of the plurality of administration powers to establish the one of the properties of the target one of the entity objects based on the obtained one of the properties of the target one of the entity objects; and establishing the one of the properties of the target one of the entity objects if the requesting one of the entity objects is authorized.

2. The method of claim 1 wherein the entity objects comprise file objects.

3. The method of claim 1 wherein the entity objects comprise at least one of account objects, resource objects or exchange objects.

4. The method of claim 3 wherein account objects include users and wherein the requesting one of the entity objects comprises a user.

5. The method of claim 4 further comprising defining active objects, each of the active objects being associated with a plurality of the entity objects and wherein at least one of the plurality of rules specifies one of the active objects as target ones of the entity objects.

6. The method of claim 4 further comprising defining a wildcard identifier defining a criterion for one of the properties and wherein at least one of the plurality of rules associates the wildcard with the requesting one of the entity objects to designate a property of the target one of the entity objects used to determine if the requesting one of the plurality of entity objects is authorized to invoke the associated one of the plurality of administration powers to establish properties of the target one of the entity objects based on the one of the properties associated with the criterion.

7. The method of claim 6 wherein ones of the account objects have a property designating one of the users as a manager and wherein the wildcard identifier authorizes designated managers of account objects to invoke the associated one of the plurality of administration powers of the at least one of the plurality of rules associating the wildcard with the requesting one of the entity objects.

8. The method of claim 4 further comprising a plurality of policy objects constraining invoking of ones of the plurality of administration powers by authorized ones of the entity objects and wherein the step of establishing the one of the properties of the target one of the entity objects if the requesting one of the entity objects is authorized is preceded by the steps of:

determining if any of the plurality of policy objects apply to the request based on at least one of the requesting one of the entity objects, the target one of the entity objects and the one of the properties of the target one of the entity objects to be established;

determining if policy objects which apply are satisfied; and wherein establishing the one of the properties of the target one of the entity objects if the requesting one of the entity objects is authorized further comprises establishing the one of the properties of the target one of the entity objects if the policy objects which apply are satisfied.

9. The method of claim 8 wherein at least one of the policy objects is associated with a user defined script and wherein determining if policy objects which apply are satisfied comprises invoking the user defined script if the at least one of the policy objects applies.

10. The method of claim 9 wherein the user defined script populates the request to allow establishing the one of the properties of the target one of the entity objects.

11. The method of claim 4 further comprising establishing a plurality of trigger scripts, ones of the trigger scripts comprising at least one of the administrator authorities and at least one other executable action to be invoked and wherein the step of establishing the one of the properties of the target one of the entity objects if the requesting one of the entity objects is authorized comprises invoking at least one of the trigger scripts associated with the received request.

12. The method of claim 11 wherein the trigger scripts are revokable and wherein the method further comprises revoking actions performed by the invoked trigger script if an error is encountered during execution of the invoked trigger script.

13. The method of claim 1 wherein defining a plurality of rules comprises defining a plurality of rules providing constraints on invoking associated ones of the administration powers based on a requesting one of the entity objects.

14. The method of claim 13 wherein the entity objects comprise file objects and wherein one of the administration powers comprises establishing permissions for files and wherein defining a plurality of rules providing constraints comprises defining at least one rule authorizing requesting entity objects to establish permissions over one of the files for at least one of the target entity objects for at least one of only a subset of user entity objects or only a subset of file permission characteristics.

15. The method of claim 13 wherein the entity objects further comprise account objects including users and wherein one of the administration powers comprises establishing a user storage quota and wherein defining a plurality of rules providing constraints comprises defining a least one rule establishing limitations on a range of values which may be provided as a user storage quota by a requesting entity object.

16. The method of claim 1 wherein the entity objects comprise account objects and wherein properties of at least one of the account objects are administered by more than one application program and wherein defining a plurality of entity objects further comprises providing virtual property objects linking respective properties from one of the application programs to another of the application programs so as to present properties from the one of the application programs and the another of the application programs to a requesting one of the account objects without distinguishing the application programs administering the properties and wherein providing virtual property objects is executed by an administrator application executing as a server application on the network environment.

17. The method of claim 8 wherein establishing the one of the properties of the target one of the entity objects if the policy objects which apply are satisfied further comprises establishing the one of the properties of the target one of the entity objects if all of the policy objects which apply are satisfied.

18. The method of claim 8 wherein establishing the one of the properties of the target one of the entity objects if the policy objects which apply are satisfied further comprises establishing the one of the properties of the target one of the entity objects if any of the policy objects which apply are satisfied.

19. A method for distributed administration of a network environment having defined administrator authorities, the method comprising:

defining a plurality of entity objects associated with the network environment comprising at least one of account objects, resource objects or exchange objects, the entity objects having an identifier and properties, the entity objects not having the administrator authorities of the network environment;

defining a plurality of administration powers for the network environment, the administration powers establishing the properties of selected ones of the plurality of entity objects using the administrator authorities of the network environment;

defining a plurality of rules specifying ones of the plurality of entity objects authorized to invoke ones of the plurality of administration powers to establish properties of target ones of the entity objects;

defining a plurality of policy objects constraining invoking of ones of the plurality of administration powers by authorized ones of the entity objects, at least one of the policy objects being associated with a user defined script;

receiving a request to establish one of the properties of a target one of the entity objects from a requesting one of the entity objects, the requesting one of the entity objects comprising a user account object; and wherein the following are executed by an administrator application executing on the network environment responsive to the received request:

identifying one of the plurality of rules associated with one of the plurality of administration powers for the one of the properties;

determining if any of the plurality of policy objects apply to the request based on at least one of the requesting user, the target one of the entity objects and the one of the properties of the target one of the entity objects to be established;

determining if policy objects which apply are satisfied, wherein determining if policy objects which apply are satisfied further comprises invoking the user defined script of one of the policy objects which applies which has an associated user defined script;

executing the identified one of the plurality of rules to determine if the requesting user is authorized to invoke the associated one of the plurality of administration powers to establish the one of the properties of the target one of the entity objects; and establishing the one of the properties of the target one of the entity objects if the requesting user is authorized and the policy objects which apply are satisfied.

20. The method of claim 19 wherein the user defined script populates the request to allow establishing the one of the properties of the target one of the entity objects.

21. A method for distributed administration of a network environment having defined administrator authorities, the method comprising:

defining a plurality of entity objects associated with the network environment comprising at least one of account objects, resource objects or exchange objects, the entity objects having an identifier and properties, the entity objects not having the administrator authorities of the network environment;

defining a plurality of administration powers for the network environment, the administration powers establishing the properties of selected ones of the plurality of entity objects using the administrator authorities of the network environment;

defining a plurality of rules specifying ones of the plurality of entity objects authorized to invoke ones of the plurality of administration powers to establish properties of target ones of the entity objects;

receiving a request to establish one of the properties of a target one of the entity objects from a requesting one of the entity objects, the requesting one of the entity objects comprising a user account object; and wherein the following are executed by an administrator application executing on the network environment responsive to the received request:

identifying one of the plurality of rules associated with one of the plurality of administration powers for the one of the properties;

executing the identified one of the plurality of rules to determine if the requesting user is authorized to invoke the associated one of the plurality of administration powers to establish the one of the properties of the target one of the entity objects;

establishing a plurality of user defined trigger scripts, ones of the user defined trigger scripts comprising at least one of the administrator authorities and at least one other executable action to be invoked; and establishing the one of the properties of the target one of the entity objects if the requesting user is authorized, wherein establishing the one of the properties includes invoking at least one of the user defined trigger scripts associated with the received request.

22. The method of claim 21 wherein the user defied trigger scripts are revokable and wherein the method further comprises revoking actions performed by the invoked trigger script if an error is encountered during execution of the invoked trigger script.

23. A method for distributed administration of a network environment having defined administrator authorities, the method comprising:

defining a plurality of entity objects including account objects associated with the network environment, the entity objects having an identifier and properties, the entity objects not having the administrator authorities of the network environment, wherein properties of at least one of the account objects are administered by more than one application program;

defining a plurality of administration powers for the network environment, the administration powers establishing the properties of selected ones of the plurality of entity objects using the administrator authorities of the network environment;

defining a plurality of rules specifying ones of the plurality of entity objects authorized to invoke ones of the plurality of administration powers to establish properties of target ones of the entity objects;

receiving a request to establish one of the properties of a target one of the entity objects from a requesting one of the entity objects; and wherein the following are executed by a server side administrator application executing on the network environment:

providing virtual property objects linking respective properties from one of the application programs to another of the application programs so as to present properties from the one of the application programs and the another of the application programs to a requesting one of the entity objects without distinguishing the application programs administering the properties;

identifying one of the plurality of rules associated with one of the plurality of administration powers for the one of the properties;

executing the identified one of the plurality of rules to determine if the requesting one of the entity objects is authorized to invoke the associated one of the plurality of administration powers to establish the one of the properties of the target one of the entity objects; and establishing the one of the properties of the target one of the entity objects if the requesting one of the entity objects is authorized.

24. A system for distributed administration of a network environment having defined administrator authorities, the system comprising:

a plurality of entity objects associated with the network environment, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects based on at least one of the properties of the target ones of the entity object;

a presentation layer that receives a request to establish one of the properties of a target one of the entity objects from a requesting one of the entity objects and provides information to the requesting one of the entity objects;

a business layer that identifies one of the plurality of rules associated with one of the plurality of administration powers for the one of the properties, obtains the at least one of the properties of the target one of the entity objects designated by the identified rule from a data layer, executes the identified one of the plurality of rules to determine if the requesting one of the entity objects is authorized to invoke the associated one of the plurality of administration powers to establish the one of the properties of the target one of the entity objects based on the obtained one of the properties of the target one of the entity objects and establishes the one of the properties of the target one of the entity objects through the data layer if the requesting one of the entity objects is authorized; and a data layer that interfaces the business layer to resources of the network environment and obtains the at least one of the properties of the target one of the entity objects designated by the identified rule responsive to a request from the business layer and establishes the one of the properties of the target one of the entity objects responsive to the business layer.

25. A system for distributed administration of a network environment having defined administrator authorities, the system comprising:

a plurality of entity objects associated with the network environment, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects based on at least one of the properties of the target ones of the entity object;

an administrator application executing on the network environment that receives a request to establish one of the properties of a target one of the entity objects from a requesting one of the entity objects, the administrator application comprising:

means for identifying one of the plurality of rules associated with one of the plurality of administration powers for the one of the properties;

means for means for obtaining the at least one of the properties of the target one of the entity objects designated by the identified rule;

means for executing the identified one of the plurality of rules to determine if the requesting one of the entity objects is authorized to invoke the associated one of the plurality of administration powers to establish the one of the properties of the target one of the entity objects based on the obtained one of the properties of the target one of the entity objects; and means for establishing the one of the properties of the target one of the entity objects if the requesting one of the entity objects is authorized.

26. A system for distributed administration of a network environment having defined administrator authorities, the system comprising:

a plurality of entity objects associated with the network environment comprising at least one of account objects, resource objects or exchange objects, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects;

a plurality of policy objects constraining invoking of ones of the plurality of administration powers by authorized ones of the entity objects, at least one of the policy objects being associated with a user defined script;

an administrator application executing on the network environment that receives a request to establish one of the properties of a target one of the entity objects from a requesting one of the entity objects, the requesting one of the entity objects comprising a user account object, the administrator application comprising:

means for identifying one of the plurality of rules associated with one of the plurality of administration powers for the one of the properties;

means for determining if any of the plurality of policy objects apply to the request based on at least one of the requesting user, the target one of the entity objects and the one of the properties of the target one of the entity objects to be established;

means for determining if policy objects which apply are satisfied, wherein the means for determining if policy objects which apply are satisfied further comprises means for invoking the user defined script of one of the policy objects which applies which has an associated user defined script;

means for executing the identified one of the plurality of rules to determine if the requesting user is authorized to invoke the associated one of the plurality of administration powers to establish the one of the properties of the target one of the entity objects; and means for establishing the one of the properties of the target one of the entity objects if the requesting user is authorized and the policy objects which apply are satisfied.

27. A system for distributed administration of a network environment having defined administrator authorities, the system comprising:

a plurality of entity objects associated with the network environment comprising at least one of account objects, resource objects or exchange objects, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects;

a plurality of user defined trigger scripts, ones of the user defined trigger scripts comprising at least one of the administrator authorities and at least one other executable action to be invoked;

an administrator application executing on the network environment that receives a request to establish one of the properties of a target one of the entity objects from a requesting one of the entity objects, the requesting one of the entity objects comprising a user account object, the administrator application comprising:

means for identifying one of the plurality of rules associated with one of the plurality of administration powers for the one of the properties;

means for executing the identified one of the plurality of rules to determine if the requesting user is authorized to invoke the associated one of the plurality of administration powers to establish the one of the properties of the target one of the entity objects; and means for establishing the one of the properties of the target one of the entity objects if the requesting user is authorized, wherein establishing the one of the properties includes invoking at least one of the user defined trigger scripts associated with the received request.

28. A system for distributed administration of a network environment having defined administrator authorities, the system comprising:

a plurality of entity objects including account objects associated with the network environment, the entity objects having an identifier and properties, the entity objects not having the administrator authorities of the network environment, wherein properties of at least one of the account objects are administered by more than one application program;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects;

a server side administrator application executing on the network environment that receives a request to establish one of the properties of a target one of the entity objects from a requesting one of the entity objects, the administrator application comprising:

means for providing virtual property objects linking respective properties from one of the application programs to another of the application programs so as to present properties from the one of the application programs and the another of the application programs to a requesting one of the entity objects without distinguishing the application programs administering the properties;

means for identifying one of the plurality of rules associated with one of the plurality of administration powers for the one of the properties;

means for executing the identified one of the plurality of rules to determine if the requesting one of the entity objects is authorized to invoke the associated one of the plurality of administration powers to establish the one of the properties of the target one of the entity objects; and means for establishing the one of the properties of the target one of the entity objects if the requesting one of the entity objects is authorized.

29. A computer program product for distributed administration of a network environment having defined administrator authorities, the network environment having:

a plurality of entity objects associated with the network environment, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects based on at least one of the properties of the target ones of the entity object;

wherein the computer program product comprises an administrator application configured to be provided on the network environment so as to receive a request to establish one of the properties of a target one of the entity objects from a requesting one of the entity objects, the administrator application comprising:

a computer-readable storage medium having computer-readable program code embodied in said medium, said computer-readable program code comprising:

computer-readable program code which identifies one of the plurality of rules associated with one of the plurality of administration powers for the one of the properties;

computer-readable program code which obtains the at least one of the properties of the target one of the entity objects designated by the identified rule;

computer-readable program code which executes the identified one of the plurality of rules to determine if the requesting one of the entity objects is authorized to invoke the associated one of the plurality of administration powers to establish the one of the properties of the target one of the entity objects based on the obtained one of the properties of the target one of the entity objects; and computer-readable program code which establishes the one of the properties of the target one of the entity objects if the requesting one of the entity objects is authorized.

30. A computer program product for distributed administration of a network environment having defined administrator authorities, the network environment having:

a plurality of entity objects associated with the network environment comprising at least one of account objects, resource objects or exchange objects, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects;

a plurality of policy objects constraining invoking of ones of the plurality of administration powers by authorized ones of the entity objects, at least one of the policy objects being associated with a user defined script;

wherein the computer program product comprises an administrator application configured to be provided on the network environment so as to receive a request to establish one of the properties of a target one of the entity objects from a requesting one of the entity objects, the requesting one of the entity objects comprising a user account, the administrator application comprising:

a computer-readable storage medium having computer-readable program code embodied in said medium, said computer-readable program code comprising:

computer-readable program code which identifies one of the plurality of rules associated with one of the plurality of administration powers for the one of the properties;

computer-readable program code which determines if any of the plurality of policy objects apply to the request based on at least one of the requesting user, the target one of the entity objects and the one of the properties of the target one of the entity objects to be established;

computer-readable program code which determines if policy objects which apply are satisfied, wherein the computer-readable program code which determines if policy objects which apply are satisfied further comprises computer-readable program code which invokes the user defined script of one of the policy objects which applies which has an associated user defined script;

computer-readable program code which executes the identified one of the plurality of rules to determine if the requesting user is authorized to invoke the associated one of the plurality of administration powers to establish the one of the properties of the target one of the entity objects; and computer-readable program code which establishes the one of the properties of the target one of the entity objects if the requesting user is authorized and the policy objects which apply are satisfied.

31. A computer program product for distributed administration of a network environment having defined administrator authorities, the network environment having:

a plurality of entity objects associated with the network environment comprising at least one of account objects, resource objects or exchange objects, the entity objects having an identifier and properties, the entity objects not having the administrator authorities of the network environment;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects;

a plurality of user defined trigger scripts, ones of the user defined trigger scripts comprising at least one of the administrator authorities and at least one other executable action to be invoked;

wherein the computer program product comprises an administrator application configured to be provided on the network environment so as to receive a request to establish one of the properties of a target one of the entity objects from a requesting one of the entity objects, the requesting one of the entity objects comprising a user account, the administrator application comprising:

a computer-readable storage medium having computer-readable program code embodied in said medium, said computer-readable program code comprising:

computer-readable program code which identifies one of the plurality of rules associated with one of the plurality of administration powers for the one of the properties;

computer-readable program code which executes the identified one of the plurality of rules to determine if the requesting user is authorized to invoke the associated one of the plurality of administration powers to establish the one of the properties of the target one of the entity objects; and computer-readable program code which establishes the one of the properties of the target one of the entity objects if the requesting user is authorized, wherein establishing the one of the properties includes invoking at least one of the user defined trigger scripts associated with the received request.

32. A computer program product for distributed administration of a network environment having defined administrator authorities, the network environment having:

a plurality of entity objects including account objects associated with the network environment, the entity objects having an identifier and properties, the entity objects not having the administrator authorities of the network environment, wherein properties of at least one of the account objects are administered by more than one application program;

a plurality of administration powers for the network environment, the administration powers establishing the properties of selected ones of the plurality of entity objects using the administrator authorities of the network environment;

a plurality of rules specifying ones of the plurality of entity objects authorized to invoke ones of the plurality of administration powers to establish properties of target ones of the entity objects;

wherein the computer program product comprises a server side administrator application configured to be provided on the network environment that receives a request to establish one of the properties of a target one of the entity objects from a requesting one of the entity objects, the administrator application comprising:

a computer-readable storage medium having computer-readable program code embodied in said medium, said computer-readable program code comprising:

computer-readable program code which provides virtual property objects linking respective properties from one of the application programs to another of the application programs so as to present properties from the one of the application programs and the another of the application programs to a requesting one of the entity objects without distinguishing the application programs administering the properties;

computer-readable program code which identifies one of the plurality of rules associated with one of the plurality of administration powers for the one of the properties;

computer-readable program code which executes the identified one of the plurality of rules to determine if the requesting one of the entity objects is authorized to invoke the associated one of the plurality of administration powers to establish the one of the properties of the target one of the entity objects; and computer-readable program code which establishes the one of the properties of the target one of the entity objects if the requesting one of the entity objects is authorized.

* * * * *